US010844173B2

(12) United States Patent
Kalyanaraman et al.

(10) Patent No.: US 10,844,173 B2
(45) Date of Patent: Nov. 24, 2020

(54) METHOD FOR THE MANUFACTURE OF A POLY(IMIDE) PREPOLYMER POWDER AND VARNISH, POLY(IMIDE) PREPOLYMER POWDER AND VARNISH PREPARED THEREBY, AND POLY(IMIDE) PREPARED THEREFROM

(71) Applicant: SABIC GLOBAL TECHNOLOGIES B.V., Bergen op Zoom (NL)

(72) Inventors: Viswanathan Kalyanaraman, Mt. Vernon, IN (US); Norimitsu Yamaguchi, Mt. Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 46 days.

(21) Appl. No.: 16/321,914

(22) PCT Filed: Aug. 1, 2017

(86) PCT No.: PCT/US2017/044884
§ 371 (c)(1),
(2) Date: Jan. 30, 2019

(87) PCT Pub. No.: WO2018/026806
PCT Pub. Date: Feb. 8, 2018

(65) Prior Publication Data
US 2019/0177482 A1 Jun. 13, 2019

Related U.S. Application Data

(60) Provisional application No. 62/370,385, filed on Aug. 3, 2016.

(51) Int. Cl.
*C08G 73/10* (2006.01)
*C08J 5/24* (2006.01)

(52) U.S. Cl.
CPC ..... *C08G 73/1032* (2013.01); *C08G 73/1028* (2013.01); *C08G 73/1046* (2013.01); *C08J 5/24* (2013.01)

(58) Field of Classification Search
CPC ..... C08G 73/10; C08G 73/1078; C08G 69/26
See application file for complete search history.

(56) References Cited

U.S. PATENT DOCUMENTS

| 3,506,583 | A | 4/1970 | Boram et al. |
| 3,893,811 | A | 7/1975 | Good et al. |
| 5,420,232 | A | 5/1995 | Dawson et al. |
| 2002/0052463 | A1 | 5/2002 | Yamaguchi et al. |
| 2002/0052464 | A1* | 5/2002 | Yamaguchi ........ C08G 73/1028 528/353 |
| 2013/0289156 | A1* | 10/2013 | Hayashi .................. C08L 63/00 522/168 |
| 2014/0093715 | A1 | 4/2014 | Fujii et al. |

FOREIGN PATENT DOCUMENTS

| CN | 104245843 A | 12/2014 |
| DE | 3830064 A | 3/1989 |
| JP | H04261482 A | 9/1992 |
| JP | H05112643 A | 5/1993 |
| JP | H0649207 A | 2/1994 |
| JP | H07118528 A | 5/1995 |
| JP | H07324134 A | 12/1995 |
| JP | H07324163 A | 12/1995 |
| JP | 2007063380 A | 3/2007 |
| WO | 2016109354 A1 | 7/2016 |

OTHER PUBLICATIONS

International Search Report for International Application No. PCT/US2017/04484; International filing Date: Aug. 1, 2017; dated Oct. 27, 2017; 7 pages.
Written Opinion of the International Searching Authority for International Application No. PCT/US2017/04484; International filing Date: Aug. 1, 2017; dated Oct. 27, 2017; 6 pages.

* cited by examiner

*Primary Examiner* — Gregory Listvoyb
(74) *Attorney, Agent, or Firm* — Cantor Colburn LLP

(57) ABSTRACT

A method for manufacturing a poly(imide) prepolymer powder includes combining a bisanhydride powder or organic diamine and a solvent comprising an alcohol, a water-soluble ketone or water to form a mixture, adding an organic diamine or bisanhydride powder to the mixture to form a poly(imide) prepolymer, and removing the solvent to provide the poly(imide) prepolymer powder. A method for manufacturing a poly(imide) prepolymer varnish includes combining a bisanhydride powder or organic diamine and a solvent comprising an alcohol, a water-soluble ketone or water to form a mixture, and adding an organic diamine or bisanhydride powder to the mixture to form a poly(imide) prepolymer. The method of manufacturing the varnish further includes at least one of adding an effective amount of a secondary or tertiary amine to solubilize the poly(imide) prepolymer powder, heating the mixture to a temperature effective to provide the varnish, or agitating the mixture to provide the varnish. The poly(imide) prepolymer powder and varnish can have a residual organic diamine content of less than or equal to 1000 ppm. A poly(imide) polymer prepared from the prepolymer powder or varnish is also disclosed.

10 Claims, No Drawings

METHOD FOR THE MANUFACTURE OF A POLY(IMIDE) PREPOLYMER POWDER AND VARNISH, POLY(IMIDE) PREPOLYMER POWDER AND VARNISH PREPARED THEREBY, AND POLY(IMIDE) PREPARED THEREFROM

CROSS REFERENCE TO RELATED APPLICATIONS

This application is a National Stage application of PCT/US2017/044884, filed Aug. 1, 2017, which claims the benefit of U.S. Provisional Application No. 62/370,385, filed Aug. 3, 2016, both of which are incorporated by reference in their entirety herein.

BACKGROUND

Poly(imide)s, in particular polyetherimides (PEI) are amorphous, transparent, high performance polymers having a glass transition temperature (Tg) of greater than 180° C. Polyetherimides further have high strength, toughness, heat resistance, and modulus, and broad chemical resistance, and so are widely used in industries as diverse as automotive, telecommunication, aerospace, electrical/electronics, transportation, and healthcare. Polyetherimides have shown versatility in various manufacturing processes, proving amenable to techniques including injection molding, extrusion, and thermoforming, to prepare various articles.

Thermoplastic polymers such as polyetherimides (PEI) are commonly used as films, protective layers, and for the formation of composite materials due to their excellent mechanical, dielectric and high heat properties. Currently, different methods are used to prepare materials with these high performance polymers. For example, melt processes can be employed, where the articles are coated with molten polymer and later cooled, however melt processes disadvantageously involve significant capital investments and also provide poor wetting of the polymer melt to the article, producing voids in the coated article. Poor wetting of the polymer melt to the article can be of particular significance when polyetherimides are used, as polyetherimides typically possess high melt viscosity. Composites, coatings, and thin films are also currently manufactured using polymer solutions containing organic solvents, which adds removal and recycling costs. In particular, polyetherimides are typically processed in harsh organic solvents such as methylene chloride, sulfolane, N-methylpyrrolidone, dichloromethane, dimethylformamide, dimethylsulfoxide, and the like. Residual solvent can be a further issue in certain applications. The use of less aggressive solvents, such as alcohols, has been explored, however the resulting polyetherimide formulations often retain high levels of residual diamines used to form the polyetherimide. High levels of residual diamines are generally not favorable for handling the material during processing, as well as environmental-related concerns.

Accordingly, there remains an unmet need for new methods to prepare polyetherimide formulations, in particular using less aggressive solvents and having reduced levels of residual diamine.

BRIEF DESCRIPTION

A method for the manufacture of a poly(imide) prepolymer powder comprises combining a bisanhydride powder or an organic diamine and a solvent comprising a $C_{1-6}$ alcohol, water soluble ketone, water, or a combination comprising at least one of the foregoing to form a mixture; adding an organic diamine or a bisanhydride powder to the slurry under conditions effective to form a poly(imide) prepolymer, provided that when the bisanhydride powder is combined with the solvent, the organic diamine is added to the mixture to form the poly(imide) prepolymer, and when the organic diamine is combined with the solvent, the bisanhydride powder is added to the mixture to form the poly(imide) prepolymer; and removing the solvent to provide the poly(imide) prepolymer powder; wherein the poly(imide) prepolymer powder has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

A method for the manufacture of a poly(imide) prepolymer powder comprises combining a bisanhydride powder or an organic amine and a solvent comprising acetone or methyl ethyl ketone and water to form a slurry; adding an organic diamine or a bisanhydride powder to the slurry under conditions effective to form a poly(imide) prepolymer, provided that when the bisanhydride powder is combined with the solvent, the organic diamine is added to the mixture to form the poly(imide) prepolymer, and when the organic diamine is combined with the solvent, the bisanhydride powder is added to the mixture to form the poly(imide) prepolymer; heating the mixture comprising the poly(imide) prepolymer to a temperature effective to provide a homogenous poly(imide) prepolymer varnish; and removing the solvent to provide a poly(imide) prepolymer powder; wherein the poly(imide) prepolymer powder has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

A method for the manufacture of a poly(imide) prepolymer varnish comprises combining a bisanhydride powder or an organic diamine and a solvent comprising a $C_{1-6}$ alcohol, water soluble ketone, water, or a combination comprising at least one of the foregoing to form a mixture; and adding an organic diamine or a bisanhydride powder to the mixture under conditions effective to form a poly(imide) prepolymer, provided that when the bisanhydride powder is combined with the solvent, the organic diamine is added to the mixture to form the poly(imide) prepolymer, and when the organic diamine is combined with the solvent, the bisanhydride powder is added to the mixture to form the poly(imide) prepolymer; wherein the method further comprises at least one of the following process steps: adding an effective amount of a secondary or tertiary amine to solubilize the poly(imide) prepolymer in the solvent; heating the mixture comprising the poly(imide) prepolymer to a temperature effective to provide a varnish; and agitating the mixture under conditions effective to provide a varnish; and wherein the poly(imide) prepolymer varnish has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

A poly(imide) prepolymer powder has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

A poly(imide) prepolymer varnish comprises the poly(imide) prepolymer powder; a secondary or tertiary amine;

and a solvent comprising water, a $C_{1-6}$ alcohol, a water soluble ketone, or a combination comprising at least one of the foregoing, preferably water, methanol, acetone, or a combination comprising at least one of the foregoing; wherein the poly(imide) prepolymer varnish has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

A poly(imide) prepolymer varnish comprises the poly (imide) prepolymer powder; and a solvent comprising acetone or methyl ethyl ketone and water, preferably wherein the water is present in an amount of at least 4 weight percent (wt %) based on the total weight of the solvent; wherein the poly(imide) prepolymer varnish has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm; and the prepolymer varnish excludes a secondary or tertiary amine.

A method of making a poly(imide) comprises heating the poly(imide) prepolymer powder or the poly(imide) prepolymer varnish to a temperature of greater than 150° C., preferably 200 to 500° C., more preferably 300 to 450° C., even more preferably 350 to 400° C. to provide the poly (imide); preferably wherein the poly(imide) has a weight average molecular weight of 5,000 to 200,000 grams per mole, preferably 50,000 to 200,000 grams per mole, more preferably 50,000 to 100,000 grams per mole, and a polydispersity index of less than or equal to 3, preferably less than or equal to 2.5.

A method of making a composite comprises contacting the poly(imide) prepolymer varnish with a fiber, fabric, veil, or mat to provide a prepreg; and heating the prepreg to a temperature of greater than 150° C., preferably 200 to 500° C., more preferably 300 to 450° C., even more preferably 350 to 400° C. to provide the composite comprising the poly(imide); wherein the poly(imide) has a weight average molecular weight of 5,000 to 200,000 grams per mole, preferably 50,000 to 200,000 grams per mole, more preferably 50,000 to 100,000 grams per mole, and a polydispersity index of less than or equal to 3, preferably less than or equal to 2.5.

The above described and other features are exemplified by the following detailed description.

DETAILED DESCRIPTION

The present inventors have discovered that poly(imide) prepolymer powders and homogenous solutions (also referred to as "varnishes") can be prepared having residual diamine contents of less than or equal to 1000 parts per million (ppm). Advantageously, the methods described herein utilize solvents that are preferred over more harsh organic solvents typically used for preparation of poly (imides). Thus, the present disclosure provides a route to poly(imide) prepolymer powders and varnishes that can overcome the above-described technical limitations associated with previously known methods.

Accordingly, one aspect of the present disclosure is a method for the manufacture of a poly(imide) prepolymer powder. The method comprises combining a bisanhydride powder and a solvent to form a mixture. In some embodiments, the bisanhydride powder can comprise a plurality of particles having a maximum diameter of less than or equal to 300 micrometers. The solvent comprises a $C_{1-6}$ alcohol, a water soluble ketone, water, or a combination comprising at least one of the foregoing. In some embodiments, the solvent comprises acetone and water. In some embodiments, the solvent comprises methyl ethyl ketone and water. The method further includes adding an organic diamine to the mixture under conditions effective to form a slurried poly (imide) prepolymer, and subsequently removing the solvent to provide the desired poly(imide) prepolymer powder.

Alternatively, the present method can also be carried out by combining the organic diamine with the solvent to form a mixture, and subsequently adding the bisanhydride powder under conditions effective to form a slurried poly(imide) prepolymer. As will be recognized by the skilled person, when the bisanhydride powder is combined with the solvent, the organic diamine is added to the mixture to form the poly(imide) prepolymer, and when the organic diamine is combined with the solvent, the bisanhydride powder is added to the mixture to form the poly(imide) prepolymer. The resulting mixture can be a slurry or a solution. For example, when bisanhydride powder is combined with the solvent, the mixture can be a slurry. When the organic diamine is combined with the solvent, the mixture can be a solution.

Solvent can be removed by any suitable technique including, for example, distillation, filtration, washing, evaporation, atmospheric drying, spray drying, reduced pressure drying, liquid-liquid extraction, and the like, or a combination comprising at least one of the foregoing solvent removal methods.

In some embodiments, prior to removal of the solvent, the method can optionally further comprise heating the mixture comprising the poly(imide) prepolymer to a temperature effective to provide a homogeneous solution comprising dissolved poly(imide) prepolymer, and subsequently removing the solvent to provide the poly(imide) prepolymer powder.

In some embodiments, combining the bisanhydride powder or the organic diamine and the solvent is at a temperature of 5 to 30° C., preferably 20 to 25° C. In some embodiments, adding the organic diamine or the bisanhydride powder to the mixture is conducted at a temperature of 5 to 30° C., preferably 20 to 25° C. In some embodiments, following addition of the organic diamine or bisanhydride powder to the mixture, the reaction is carried out for a reaction time sufficient to provide the poly(imide) prepolymer, which can be, for example greater than 5 minutes, or greater than 30 minutes, or greater than 1 hour, or greater than 15 minutes to 8 hours, or greater than 30 minutes to 8 hours, or greater than 1 to 8 hours, or 3 to 8 hours, or 4 to 8 hours. After adding the organic diamine or bisanhydride powder to the mixture, the resulting reaction mixture can be maintained at a fixed temperature, preferably at a temperature less than or equal to the boiling point of the solvent. Alternatively, the reaction temperature can be programmed to vary with maximum temperature being the boiling point of the solvent.

Advantageously, the resulting poly(imide) prepolymer powder has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm. Residual diamine content can be determined according to generally known methods including, for example, high performance liquid chromatography (HPLC).

Another aspect of the present disclosure is a method for the manufacture of a poly(imide) prepolymer homogenous solution or varnish. As used herein, the term "prepolymer varnish" refers to a homogenous solution of a poly(imide) prepolymer having reactive end groups. The method comprises combining a bisanhydride powder or an organic diamine and a solvent to form a mixture. The solvent comprises a $C_{1-6}$ alcohol, acetone water soluble ketone, water, or a combination comprising at least one of the foregoing. An organic diamine or bisanhydride powder is added to the mixture under conditions effective to provide a slurry comprising a poly(imide) prepolymer. The method further includes at least one of the following: adding an effective amount of a secondary or tertiary amine to solubilize the slurried poly(imide) prepolymer in the solvent, heating the slurry comprising the poly(imide) prepolymer powder to a temperature effective to provide a homogeneous solution, and agitating the mixture under conditions effective to provide a varnish. Thus, in some embodiments, the method comprises adding an effective amount of a secondary or tertiary amine to solubilize the poly(imide) prepolymer powder in the solvent. Alternatively, the method can include heating the slurry comprising the poly(imide) prepolymer powder to a temperature effective to provide a homogeneous solution. In some embodiments, the slurry can be heated to a temperature of greater than or equal to 25° C., for example greater than or equal to 40° C., for example 40 to 90° C., for example 50 to 80° C. In some embodiments, the method comprises both adding an effective amount of a secondary or tertiary amine to solubilize the poly(imide) prepolymer powder in the solvent and heating the slurry comprising the poly(imide) prepolymer powder to a temperature effective to provide a homogeneous solution, preferably wherein the slurry is heated to a temperature of greater than or equal to 25° C., for example greater than or equal to 40° C., for example 40 to 90° C., for example 50 to 80° C. In some embodiments, the method comprises agitating the slurry under conditions effective to provide a varnish. Agitation conditions (e.g., speed and time) can be selected by a skilled person based on the volume of the slurry, the solids content, the temperature, etc., using the guidelines provided herein. For example, the agitation speed can be 80 to 100 RPM, for example about 90 RPM for a time of 15 minutes to 1 hour. Exemplary conditions are further described in the working examples below. In some embodiments, the method comprises agitating the slurry under conditions effective to provide a varnish and heating the slurry comprising the poly(imide) prepolymer powder to a temperature of greater than or equal to 25° C., for example greater than or equal to 40° C., for example 40 to 90° C., for example 50 to 80° C.

In some embodiments, combining the bisanhydride powder or the organic diamine and the solvent is at a temperature of 5 to 30° C., preferably 20 to 25° C. In some embodiments, adding the organic diamine or the bisanhydride powder to the mixture is conducted at a temperature of 5 to 30° C., preferably 20 to 25° C. In some embodiments, after adding the organic diamine or the bisanhydride powder, the resulting reaction mixture can be maintained at a fixed temperature, preferably at a temperature less than or equal to the boiling point of the solvent. Alternatively, the reaction temperature can be programmed to vary with the maximum temperature being the boiling point of the solvent. In some embodiments, following addition of the organic amine or the bisanhydride powder, the reaction is carried out for a reaction time sufficient to provide the poly(imide) prepolymer, for example greater than 5 minutes, or greater than 30 minutes, or greater than 1 hour, or greater than 15 minutes to 8 hours, or greater than 30 minutes to 8 hours, or greater than 1 to 8 hours, or 3 to 8 hours, or 4 to 8 hours.

Advantageously, the resulting poly(imide) prepolymer varnish has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

The poly(imide) prepolymer varnish can have a solids content of 0.1 to 80 wt %, or 5 to 75 wt %, or 10 to 60%.

The solvent useful for the above-described methods of making the poly(imide) prepolymer powder and varnish can be a $C_{1-6}$ alcohol, a water soluble ketone, water, or a combination comprising at least one of the foregoing. The $C_{1-6}$ alcohol can include methanol, ethanol, n-propanol, isopropanol, n-butanol, t-butanol, sec-butanol, 1-pentanol, 2-pentanol, 3-pentanol, 1-hexanol, 2-hexanol, 3-hexanol, 2-ethyl-1-butanol, 3-methyl-1-butanol, 3-methyl-2-butanol, 2-methyl-2-butanol, 2,2-dimethyl-1-propanol, ethylene glycol, diethylene glycol, propylene glycol, or a combination comprising at least one of the foregoing. In some embodiments, the $C_{1-6}$ alcohol is substantially miscible with water. For example, the $C_{1-6}$ alcohol can comprise methanol, ethanol, n-propanol, isopropanol, or a combination comprising at least one of the foregoing. In an embodiment, the solvent comprises methanol, ethanol, or a combination comprising at least one of the foregoing. In some embodiments, the solvent comprises methanol. As used herein, "water soluble ketone" refers to a ketone-containing solvent having a solubility of at least 1% by weight in water at 25° C. Exemplary water soluble ketones can include, for example, acetone, propanone, cyclobutanone, cyclopentanone, cyclohexanone, diacetone alcohol, 2-butanone (also referred to as methyl ethyl ketone (MEK)), 5-hexanedione, 1,4-cyclohexanedione, 3-hydroxyacetophenone, 1,3-cyclohexanedione, cyclohexanone, or a combination comprising at least one of the foregoing, preferably acetone, methyl ethyl ketone, or a combination comprising at least one of the foregoing. In some embodiments, the solvent comprises acetone. In some embodiments, the solvent comprises methyl ethyl ketone. In some embodiments, the solvent comprises acetone and water, preferably wherein the water is present in an amount of at least 4 wt %, or 4 to 25 wt %, or 4 to 15 wt %, or 4 to 10 wt %, based on the total weight of the solvent. In some embodiments, the solvent comprises methyl ethyl ketone and water, preferably wherein the water is present in an amount of at least 0.01 wt %, for example 0.01 to 25 wt %, or 0.01 to 15 wt %, or 0.01 to 10 wt %, based on the total weight of the solvent. In some embodiments, the solvent consists of methyl ethyl ketone (i.e., no other solvent including water is present).

In some embodiments, the solvent comprises less than or equal to 25 wt %, preferably less than 20 wt %, more preferably less than 10 wt % of a solvent in which the polyetherimide is soluble, for example, N-methyl pyrrolidone, dimethylacetamide, N,N-dimethyl formamide, tetrahydrofuran, sulfolane, anisole, cyclohexanone, cyclopentanone, dimethylsulfoxide, or a combination comprising at least one of the foregoing. In some embodiments, the solvent comprises less than or equal to 25 wt %, preferably less than 20 wt %, more preferably less than 10 wt % of a solvent in which the polyetherimide is not soluble, for example, 2-methoxyethyl acetate, 2-methoxyethyl acetate, 2-butoxyethyl acetate, 1-methoxy-2-propanol acetate, glycol ethers, glycol esters, or a combination comprising at least one of the foregoing. For example, the solvent can include 0.01 to 25 wt %, or 0.1 to 25 wt %, or 0.1 to 20 wt %, or 0.1 to 10 wt % of the aforementioned solvents or their combination. Without wishing to be bound by theory, it is believed that the optional presence of the additional solvent can aid in formation of uniform films through action as a coalescing agent, when desired, as discussed further in the working examples below.

In an embodiment, the solvent comprises less than 1 wt %, or less than 0.1 wt %, or is devoid of, a halogenated solvent (e.g., chlorobenzene, a dichlorobenzene, and the like), N-methyl pyrrolidone, dimethylacetamide, N,N-dimethyl formamide, tetrahydrofuran, sulfolane, anisole, cyclohexanone, cyclopentanone, dimethylsulfoxide, or a combination comprising at least one of the foregoing.

The poly(imide) prepolymers can be prepared from bisanhydrides of formula (1)

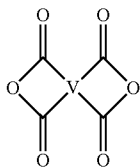
(1)

wherein each V is the same or different, and is a substituted or unsubstituted tetravalent $C_{4-40}$ hydrocarbon group, for example a substituted or unsubstituted $C_{6-20}$ aromatic hydrocarbon group, a substituted or unsubstituted, straight or branched chain, saturated or unsaturated $C_{2-20}$ aliphatic group, or a substituted or unsubstituted $C_{4-8}$ cycloaliphatic group, in particular a substituted or unsubstituted $C_{6-20}$ aromatic hydrocarbon group. Exemplary aromatic hydrocarbon groups include any of those of the formulas

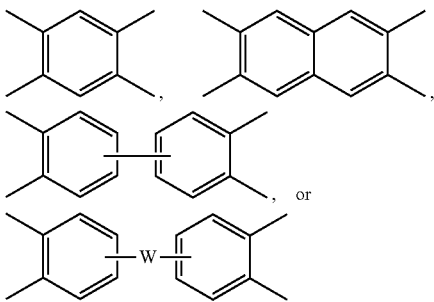

wherein W is a single bond, —O—, —S—, —C(O)—, —SO$_2$—, —SO—, a $C_{1-18}$ hydrocarbylene group that can be cyclic, acyclic, aromatic, or non-aromatic, —P(R$^a$)(=O)— wherein R$^a$ is a $C_{1-8}$ alkyl or $C_{6-12}$ aryl, or —C$_y$H$_{2y}$— wherein y is an integer from 1 to 5 or a halogenated derivative thereof (which includes perfluoroalkylene groups), or a group of the formula —O—Z—O— as described in formula (2) below.

In some embodiments, the poly(imide) prepolymers are prepared from bisanhydrides of formula (2)

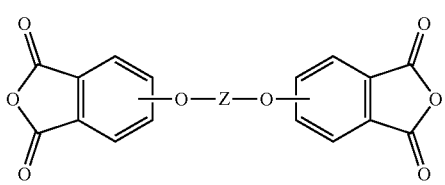
(2)

wherein the divalent bonds of the —O—Z—O— group are in the 3,3', 3,4', 4,3', or the 4,4' positions. The group Z in —O—Z—O— of formula (2) is also a substituted or unsubstituted divalent organic group, and can be an aromatic $C_{6-24}$ monocyclic or polycyclic moiety optionally substituted with 1 to 6 $C_{1-6}$ alkyl groups, 1 to 8 halogen atoms, or a combination thereof, provided that the valence of Z is not exceeded. Exemplary groups Z include groups derived from a dihydroxy compound of formula (3)

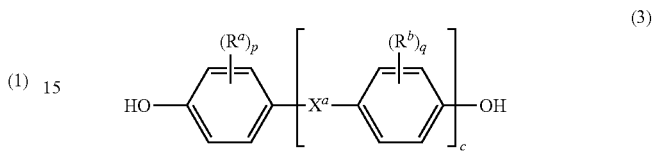
(3)

wherein R$^a$ and R$^b$ can be the same or different and are a halogen atom or a monovalent $C_{1-6}$ alkyl group, for example; p and q are each independently integers of 0 to 4; c is 0 to 4; and X$^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group X$^a$ can be a single bond, —O—, —S—, —S(O)—, —SO$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3a)

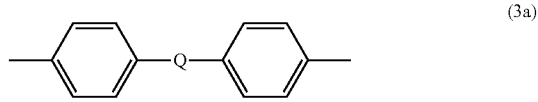
(3a)

wherein Q is —O—, —S—, —C(O)—, —SO$_2$—, —SO—, —P(R$^a$)(=O)— wherein R$^a$ is a $C_{1-8}$ alkyl or $C_{6-12}$ aryl, or —C$_y$H$_{2y}$— wherein y is an integer from 1 to 5 or a halogenated derivative thereof (including a perfluoroalkylene group). In a specific embodiment Z is derived from bisphenol A, such that Q in formula (3a) is 2,2-isopropylidene.

Illustrative examples of bisanhydrides include 3,3-bis[4-(3,4-dicarboxyphenoxy)phenyl]propane bisanhydride; 4,4'-bis(3,4-dicarboxyphenoxy)diphenyl ether bisanhydride; 4,4'-bis(3,4-dicarboxyphenoxy)diphenyl sulfide bisanhydride; 4,4'-bis(3,4-dicarboxyphenoxy)benzophenone bisanhydride; 4,4'-bis(3,4-dicarboxyphenoxy)diphenyl sulfone bisanhydride; 2,2-bis[4-(2,3-dicarboxyphenoxy)phenyl]propane bisanhydride; 4,4'-bis(2,3-dicarboxyphenoxy)diphenyl ether bisanhydride; 4,4'-bis(2,3-dicarboxyphenoxy)diphenyl sulfide bisanhydride; 4,4'-bis(2,3-dicarboxyphenoxy)benzophenone bisanhydride; 4,4'-bis(2,3-dicarboxyphenoxy)diphenyl sulfone bisanhydride; 4-(2,3-dicarboxyphenoxy)-4'-(3,4-dicarboxyphenoxy)diphenyl-2,2-propane bisanhydride; 4-(2,3-dicarboxyphenoxy)-4'-(3,4-dicarboxyphenoxy)diphenyl ether bisanhydride; 4-(2,3-dicarboxyphenoxy)-4'-(3,4-dicarboxyphenoxy)diphenyl sulfide bisanhydride; 4-(2,3- dicarboxyphenoxy)-4'-(3,4-dicarboxyphenoxy) benzophenone bisanhydride; and, 4-(2,3-dicarboxyphenoxy)-4'-(3,4-dicarboxyphenoxy)diphenyl sulfone bisanhydride, as well as various combinations thereof.

The bisanhydrides of formulas (1) or (2) can be reacted with an organic diamine of formula (4)

wherein R is a substituted or unsubstituted divalent $C_{6-20}$ aromatic hydrocarbon group, a substituted or unsubstituted, straight or branched chain $C_{4-20}$ alkylene group, a substituted or unsubstituted $C_{3-8}$ cycloalkylene group, or a combination comprising at least one of the foregoing, in particular a divalent group of formula (5)

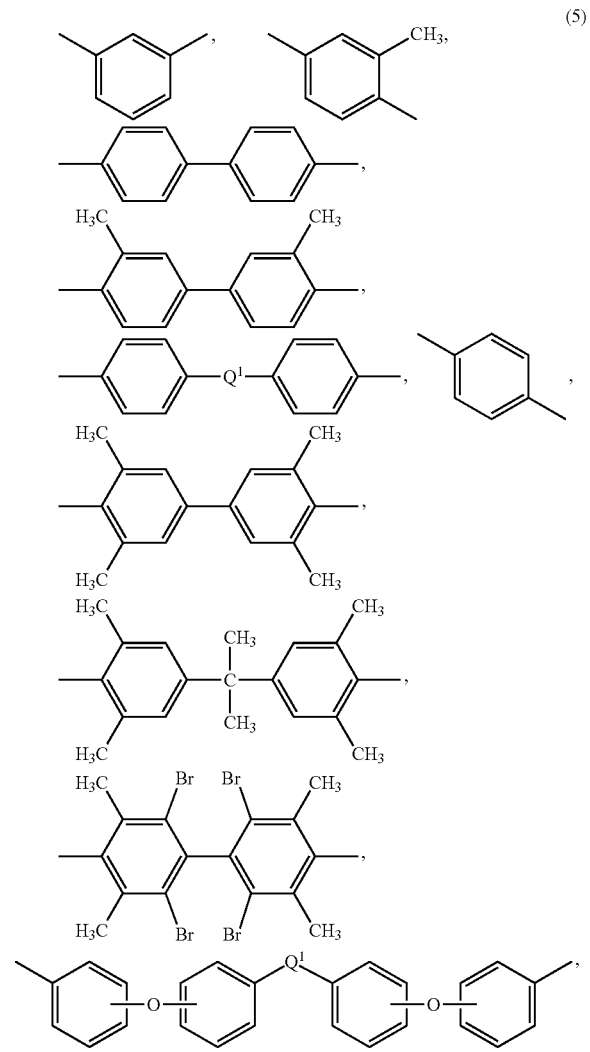

wherein $Q^1$ is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In an embodiment each R is m-phenylene, p-phenylene, 4,4'-diphenylene sulfone, or a combination comprising at least one of the foregoing. In some embodiments, no R groups contain sulfone groups. In another embodiment, at least 10 mol % of the R groups contain sulfone groups, for example 10 to 80 wt % of the R groups contain sulfone groups, in particular 4,4'-diphenylene sulfone groups.

Examples of organic diamines include ethylenediamine, propylenediamine, trimethylenediamine, diethylenetriamine, triethylene tetramine, hexamethylenediamine, heptamethylenediamine, octamethylenediamine, nonamethylenediamine, decamethylenediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis(3-aminopropyl) amine, 3-methoxyhexamethylenediamine, 1,2-bis(3-aminopropoxy)ethane, bis(3-aminopropyl)sulfide, 1,4-cyclohexanediamine, bis-(4-aminocyclohexyl)methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylenediamine, 5-methyl-4,6-diethyl-1,3-phenylenediamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis (4-aminophenyl) ether, 4,4'-oxydianiline, 3,3'-oxydianiline, and 3,4'-oxydianiline. Combinations of these compounds can also be used. In some embodiments the organic diamine is m-phenylenediamine, p-phenylenediamine, 4,4'-sulfonyl dianiline, 4,4'-oxidianiline, or a combination comprising one or more of the foregoing.

In some embodiments, the bisanhydrides of formulas (1) or (2) can be reacted with a diamine component comprising an organic diamine (4) as described above or a mixture of diamines, and a polysiloxane diamine of formula (6)

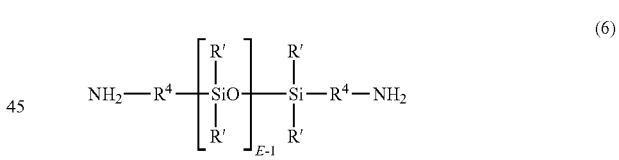

wherein each R' is independently a $C_{1-13}$ monovalent hydrocarbyl group. For example, each R' can independently be a $C_{1-13}$ alkyl group, $C_{1-13}$ alkoxy group, $C_{2-13}$ alkenyl group, $C_{2-13}$ alkenyloxy group, $C_{3-6}$ cycloalkyl group, $C_{3-6}$ cycloalkoxy group, $C_{6-14}$ aryl group, $C_{6-10}$ aryloxy group, $C_{7-13}$ arylalkyl group, $C_{7-13}$ arylalkoxy group, $C_{7-13}$ alkylaryl group, or $C_{7-13}$ alkylaryloxy group. The foregoing groups can be fully or partially halogenated with fluorine, chlorine, bromine, or iodine, or a combination comprising at least one of the foregoing. In an embodiment no halogens are present. Combinations of the foregoing R' groups can be used in the same copolymer. In an embodiment, the polysiloxane diamine comprises R' groups that have minimal hydrocarbon content, e.g., a methyl group.

E in formula (6) has an average value of 5 to 100, and each $R^4$ is independently a $C_2-C_{20}$ hydrocarbon, in particular a $C_2-C_{20}$ arylene, alkylene, or arylenealkylene group. In an embodiment $R^4$ is a $C_2-C_{20}$ alkyl group, specifically a $C_2-C_{20}$ alkyl group such as propylene, and E has an average value of 5 to 100, 5 to 75, 5 to 60, 5 to 15, or 15 to 40. Procedures for making the polysiloxane diamines of formula (6) are well known in the art.

The diamine component can contain 10 to 90 mole percent (mol %), or 20 to 50 mol %, or 25 to 40 mol % of polysiloxane diamine (6) and 10 to 90 mol %, or 50 to 80 mol %, or 60 to 75 mol % of diamine (4). The diamine components can be physically mixed prior to reaction with the bisanhydride(s), thus forming a substantially random copolymer. Alternatively, block or alternating copolymers can be formed by selective reaction of (4) and (6) with bisanhydrides (1) or (2), to make poly(imide) blocks that are subsequently reacted together. Thus, the poly(imide)-siloxane copolymer can be a block, random, or graft copolymer.

The relative ratios of the bisanhydride and the diamine can be varied depending on the desired properties of the poly(imide)s. Use of an excess of either monomer can result in a polymer having functionalized end groups. In an embodiment, a mole ratio of the bisanhydride to the diamine can be 1:1 to 1:1.3, preferably 1:1 to 1:1.2 or 1:1 to 1:1.1. In another embodiment, a mole ratio of the diamine to the bisanhydride is 1:1 to 1:1.3, preferably 1:1 to 1:1.2 or 1:1 to 1:1.1.

The poly(imide) prepolymers formed by the methods disclosed herein comprise partially reacted units of (7) and (8) to fully reacted units of formula (9)

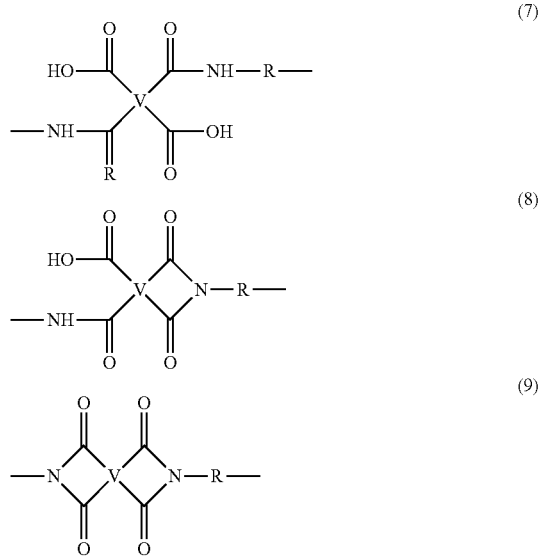

wherein V and R are as defined above. The poly(imide) prepolymer contains at least one unit (7), 0 or 1 or more units (8), and 0 or 1 or more units (9), for example 1 to 200 or 1 to 100 units (7), 0 to 200 or 0 to 100 units (8), or 0 to 200 or 0 to 100 units (9). An imidization value for the poly(imide) prepolymer can be determined using the relationship $$(2(9)+(8))/(2(7)+2(8)+2(9))$$

wherein (7), (8), and (9) stand for the number of units (7), (8), and (9), respectively. In some embodiments, the imidization value of the poly(imide) prepolymer is less than or equal to 0.2, less than or equal to 0.15, or less than or equal to 0.1. In some embodiments, the poly(imide) prepolymer has an imidization value of greater than 0.2, for example greater than 0.25, greater than 0.3, or greater than 0.5, provided that the desired solubility of the poly(imide) prepolymer is maintained. The number of units of each type can be determined by spectroscopic methods, for example FT-IR.

In some embodiments, the above-described methods can optionally further comprise adding an end-capping agent to the slurry such that the resulting poly(imide) prepolymer further comprises an endcapping agent. Endcapping agents are commonly used to adjust the molecular weight of poly(imides). Such endcapping agents are known, and include, for example, monofunctional amines such as aniline and aminophenol, and mono-functional anhydrides such as phthalic anhydride, maleic anhydride, or nadic anhydride. The endcapping agents can be present in an amount of greater than 0.01 mole percent (mol %), for example, 0.2 to 20 mole percent (mol %), or 1 to 10 mol %, based on total moles of one of the bisanhydride or diamine monomer. In an embodiment, the poly(imide) prepolymer is partially end-capped. In another embodiment, however, no endcapping agent is present in the poly(imide) prepolymer.

A poly(imide) varnish represents another aspect of the present disclosure. The poly(imide) varnish comprises the above-described poly(imide) prepolymer powder, a secondary or tertiary amine, and a solvent comprising water, a $C_{1-6}$ alcohol, a water soluble ketone, or a combination comprising at least one of the foregoing. The solvent can be as described above. In some embodiments, the poly(imide) varnish comprises the above-described poly(imide) prepolymer powder and a solvent comprising acetone or methyl ethyl ketone and water, preferably wherein the water is present in an amount of at least 0.01 wt % based on the total weight of the solvent. When the solvent comprises acetone or methyl ethyl ketone and water, no secondary or tertiary amine is required (i.e., the poly(imide) prepolymer varnish can be devoid of any secondary or tertiary amine). When present, the mole ratio of the bisanhydride to the secondary or tertiary amine can be 1:0.5 to 1:3.0, preferably 1:0.75 to 1:2.50, more preferably 1:1 to 1:2. The mole ratio of the diamine to secondary or tertiary amine can be 1:0.5 to 1:3.0 preferably 1:0.75 to 1:2.50, more preferably 1:1 to 1:2.

In some embodiments, the amine is a secondary or a tertiary amine of the formula $R^aR^bR^cN$ wherein each $R^a$, $R^b$, and $R^c$ are the same or different and are a substituted or unsubstituted $C_{1-18}$ hydrocarbyl or hydrogen, provided that no more than one of $R^a$, $R^b$, and $R^c$ are hydrogen. Preferably each $R^a$, $R^b$, and $R^c$ are the same or different and are a substituted or unsubstituted $C_{1-12}$ alkyl, a substituted or unsubstituted $C_{1-12}$ aryl, or hydrogen, provided that no more than one of $R^a$, $R^b$, and $R^c$ are hydrogen. More preferably each $R^a$, $R^b$, and $R^c$ are the same or different and are an unsubstituted $C_{1-6}$ alkyl or a $C_{1-6}$ alkyl substituted with 1, 2, or 3 hydroxyl, halogen, nitrile, nitro, cyano, $C_{1-6}$ alkoxy, or amino groups of the formula $—NR^dR^e$ wherein each $R^d$ and W are the same or different and are a $C_{1-6}$ alkyl or $C_{1-6}$ alkoxy. Most preferably, each $R^a$, $R^b$, and $R^c$ are the same or different and are an unsubstituted $C_{1-4}$ alkyl or a $C_{1-4}$ alkyl substituted with one hydroxyl, halogen, nitrile, nitro, cyano, or $C_{1-3}$ alkoxy.

In some embodiments, the amine comprises triethylamine, dimethylethanolamine, dibutylamine, 2,4,6-tris(dimethylaminomethyl)phenol, N,N,N',N'-tetramethyl-1,3-butanediamine, N,N-dimethylcyclohexylamine, N,N-diethylethanolamine, N-ethylmorpholine, 1-zabicyclo[2.2.2]octane, triethanolamine, N,N,4-trimethyl-1-piperazineethanamine, N,N'-dimethylpiperazine, dimethylethanolamine, N-methylmorpholine, N,N-dimethylaminopropylamine, N,N,N',N'-tetramethylethylenediamine, 1,3-bis(dimethylamino)propane, N,N,N',N'-tetramethylhexamethylenediamine, diethanolamine, dimethyldodecylamine, N,N-dimethylhexadecylamine, triethylamine, N,N-diisopropylethanolamine, ethanolamine (monoethanolamine), triethylenediamine, 4-butyl-morpholine, 2(2-dimethylaminoethoxy)ethanol, 1,2-dimethylimidazole, N-[2-(dimethylamino)ethyl]-N-methylethanolamine, N,N,N',N',N''-pentamethyldiethylenetriamine, bis(2-dimethylaminoethyl)ether, N,N'-bis(1,4-dimethylpentyl)1,4-benzenediamine, or a combination comprising at least one of the foregoing. In some embodiments, the amine comprises triethylamine, dimethylethanolamine, dibutylamine, or a combination comprising at least one of the foregoing. For example, the amine comprises triethylamine. For example, the amine comprises dimethylethanolamine. For example, the amine comprises dibutylamine.

In some embodiments, the secondary or tertiary amine can be a cycloaliphatic amine or aromatic heterocyclic amine. Examples of suitable cycloaliphatic amines can include 1,4-diazabicyclo[2.2.2]octane, piperidine, piperazine, morpholine, and the like, or a combination comprising at least one of the foregoing. Examples of aromatic heterocyclic amines can include diazole, in particular, imidazole, imidazole derivatives, or a combination comprising at least one of the foregoing.

The amine can be added to the poly(imide) prepolymer varnish in an amount effective to solubilize the poly(imide) prepolymer in a $C_{1-6}$ alcohol, in a solution of the $C_{1-6}$ alcohol and deionized water, water soluble ketone, a solution of acetone or methyl ethyl ketone and deionized water, or in deionized water. For example, the amine can be present in the poly(imide) prepolymer varnish in an amount of 5 to 50 wt %, or 10 to 40 wt %, or 15 to 25 wt %, based on the combined weight of the amine and the dry weight of the poly(imide) prepolymer. In some embodiments, the secondary or tertiary amine can be present in the poly(imide) prepolymer varnish in an amount such that the moles of dianhydride relative to the moles of secondary or tertiary amine is greater than 0.33.

In some embodiments, the poly(imide) varnish comprises the above-described poly(imide) prepolymer powder, and a solvent comprising acetone and water, preferably wherein the water is present in an amount of at least 4 wt % based on the total weight of the solvent. In this embodiment, the secondary or tertiary amine can be excluded from the varnish.

In some embodiments, the poly(imide) varnish comprises the above-described poly(imide) prepolymer powder, and a solvent comprising methyl ethyl ketone and water, preferably wherein the water is present in an amount of at least 0.01 wt % based on the total weight of the solvent. In this embodiment, the secondary or tertiary amine can be excluded from the varnish Advantageously, the poly(imide) varnishes prepared from the poly(imide) prepolymer powder can have a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

In some embodiments, the solvent comprises less than or equal to 25 wt %, preferably less than 20 wt %, more preferably less than 10 wt % of a solvent in which the polyetherimide is soluble, for example, N-methyl pyrrolidone, dimethylacetamide, N,N-dimethyl formamide, tetrahydrofuran, sulfolane, anisole, cyclohexanone, cyclopentanone, dimethylsulfoxide, or a combination comprising at least one of the foregoing. In some embodiments, the solvent comprises less than or equal to 25 wt %, preferably less than 20 wt %, more preferably less than 10 wt % of a solvent in which the polyetherimide is not soluble, for example, 2-methoxyethyl acetate, 2-methoxyethyl acetate, 2-butoxyethyl acetate, 1-methoxy-2-propanol acetate, glycol ethers, glycol esters, or a combination comprising at least one of the foregoing. For example, the solvent can include 0.01 to 25 wt %, or 0.1 to 25 wt %, or 0.1 to 20 wt %, or 0.1 to 10 wt % of the aforementioned solvents or their combination. Without wishing to be bound by theory, it is believed that the optional presence of the additional solvent can aid in formation of uniform films through action as a coalescing agent, when desired.

In some embodiments, the poly(imide) prepolymer varnish can comprise less than 1 wt %, or less than 0.1 wt %, or is devoid of, a halogenated solvent (e.g., chlorobenzene, a dichlorobenzene, and the like), N-methyl pyrrolidone, dimethylacetamide, N,N-dimethyl formamide, tetrahydrofuran, sulfolane, anisole, cyclohexanone, cyclopentanone, dimethylsulfoxide, or a combination comprising at least one of the foregoing. Preferably, the poly(imide) prepolymer varnish is devoid of a halogenated solvent, a N-methyl pyrrolidone, dimethylacetamide, N,N-dimethyl formamide, tetrahydrofuran, sulfolane, or a combination comprising at least one of the foregoing.

In some embodiments, the poly(imide) prepolymer varnish can be prepared according to the above-described method (e.g., by the same method used to prepare the poly(imide) prepolymer powder, except that any drying steps to remove the solve are omitted). In some embodiments, the poly(imide) prepolymer varnish can be prepared by dissolving the poly(imide) prepolymer powder in the solvent in the presence of the secondary or tertiary amine, where the amine is present in an amount effective to solubilize the poly(imide) prepolymer powder) in the solvent. In some embodiments, the poly(imide) prepolymer varnish can be prepared by adding the poly(imide) prepolymer powder to the solvent comprising a water soluble ketone (e.g., acetone or methyl ethyl ketone) and optionally, water, and heating to a temperature effective to provide a homogeneous solution, preferably to a temperature of greater than or equal to 25° C. (i.e., no secondary or tertiary amine is required).

The poly(imide) prepolymer powders and varnishes described herein can further comprise additional components to modify their reactivity or processability, or properties of the poly(imide) prepolymers, the corresponding poly(imide)s, and articles formed therefrom. For example, the poly(imide) prepolymer powders and varnishes can further comprise a poly(imide) crosslinking agent. Such crosslinking agents are known, and include, compounds containing an amino group or an anhydride group and a crosslinkable functionality, for example ethylenic unsaturation. Examples include maleic anhydride and benzophenone tetracarboxylic acid anhydride. The crosslinking agents can be present in an amount of 0.1 to 20 mol %, more preferably 1 to 5 mol % based on total moles of one of the bisanhydride or diamine monomer.

The poly(imide) prepolymer powders and varnishes can further comprise a branching agent, for example a polyfunctional organic compound having at least three functional groups which can be, for example, amine, carboxylic acid, carboxylic acid halide, carboxylic anhydride, and mixtures thereof. A branching agent can be a substituted or unsubstituted polyfunctional $C_{1-20}$ hydrocarbon group having at least three of any one or more of the aforementioned functional groups. Exemplary branching agents can include a $C_{2-20}$ alkyltriamine, a $C_{2-20}$ alkyltetraamine, a $C_{6-20}$ aryltriamine, an oxyalkyltriamine (e.g., JEFFAMINE T-403 available from Texaco Company), trimellitic acid, trimellitic anhydride, trimellitic trichloride, and the like, and combinations comprising at least one of the foregoing. When present, the amount of branching agent can be 0.5 to 10 wt % based on the weight of the poly(imide) prepolymer.

The poly(imide) prepolymer powders and varnishes can further comprise a particulate polymer dispersible in the solvent, for example dispersible in the $C_{1-6}$ alcohol, water, water soluble ketone, or combinations comprising at least one of the foregoing. In an embodiment, the particulate polymers are preferably dispersible in water. Imidization of the poly(imide) prepolymer in the presence of the particulate polymer can provide an intimate blend of the polymer and the poly(imide). The dispersible polymers can have an average particle diameter from 0.01 to 250 micrometers (μm). Aqueous-dispersible polymers include fluoropolymers, (e.g., polytetrafluoroethylene, tetrafluoroethylene-perfluoroalkylvinylether copolymer, tetrafluoroethylene-hexafluoropropylene copolymer, polychlorotrifluoroethylene, tetrafluoroethylene-ethylene copolymer, polyvinylidene fluoride), (meth)acrylic and (meth)acrylate polymers (e.g., poly(methyl (meth)acrylate), poly(ethyl (meth)acrylate), poly(n-butyl (meth)acrylate), poly(2-ethyl hexyl (meth)acrylate), copolymers thereof, and the like), styrenic polymers (e.g., polystyrene, and copolymers of styrene-butadiene, styrene-isoprene, styrene-acrylate esters, and styrene-acrylonitrile), vinyl ester polymers (e.g., poly(vinyl acetate), poly(vinyl acetate-ethylene) copolymers, poly(vinyl proprionate), poly(vinyl versatate) and the like), vinyl chloride polymers, polyolefins (e.g., polyethylenes, polypropylenes, polybutadienes, copolymers thereof, and the like), polyurethanes, polyesters (e.g., poly(ethylene terephthalate), poly(butylene terephthalate), poly(caprolactone), copolymers thereof, and the like), polyamides, natural polymers such as polysaccharides, or a combination comprising at least one of the foregoing.

When present, the dispersible polymers can be present in an amount of 0.1 to 50 wt %, preferably 1 to 30 wt %, more preferably from 5 to 20 wt %, each based on the total weight of the poly(imide) prepolymer powder or varnish.

The poly(imide) prepolymer powders and varnishes can further comprise additives for poly(imide) compositions generally known in the art, with the provision that the additive(s) are selected so as to not significantly adversely affect the desired properties of the compositions, in particular formation of the poly(imide). Such additives include a particulate filler (such as glass, carbon, mineral, or metal), antioxidant, heat stabilizer, light stabilizer, ultraviolet (UV) light stabilizer, UV absorbing additive, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), or a combination comprising one or more of the foregoing. In general, the additives are used in the amounts generally known to be effective. For example, the total amount of the additive composition (other than any filler) can be 0.001 to 20 wt %, or 0.01 to 10 wt %, each based on the total weight of the poly(imide) prepolymer powder or varnish.

For example, a combination of a heat stabilizer, mold release agent, and ultraviolet light stabilizer can be used. Pigments, surface effect agents, and nanosized fillers are also specifically contemplated, as such materials can be readily co-dispersed with monomers, or pre-combined with the monomers. When present, the nanosized fillers can be present in an amount of 0.01 to 50 wt %, preferably 1 to 30 wt %, more preferably from 2 to 10 wt %, each based on the total weight of the poly(imide) prepolymer powder or varnish.

The poly(imide) prepolymer powders and varnishes described herein can be useful for preparing the corresponding poly(imide)s. For example, a method of making a poly(imide) can include heating the above-described poly(imide) prepolymer powder or the poly(imide) prepolymer varnish to a temperature of greater than 150° C., preferably 200 to 500° C., more preferably 300 to 450° C., even more preferably 350 to 400° C. to provide the poly(imide).

The poly(imide) formed from the poly(imide) prepolymer comprise more than 1, for example 10 to 1000, or 10 to 500, structural units of formula (10)

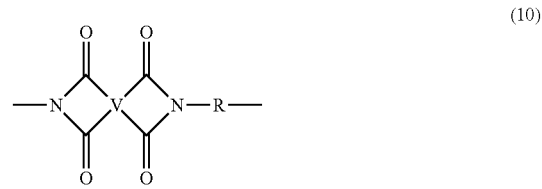

wherein each V is the same or different, and is as described in formula (1), and each R is the same or different, and is defined as in formula (4). The polyetherimides comprise more than 1, for example 10 to 1000, or 10 to 500, structural units of formula (11)

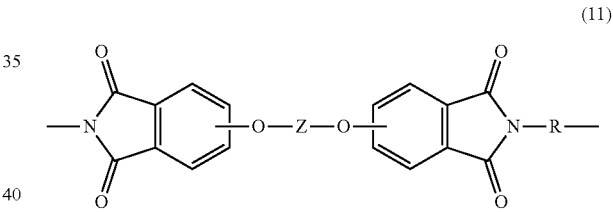

wherein each Z is the same or different, and is as described in formula (2), and each R is the same or different, and is as described in formula (4), preferably m-phenylene or p-phenylene.

The polyetherimides can optionally further comprise additional structural imide units, for example imide units of formula (10) wherein R and V are as described in formula (10), for example, V is

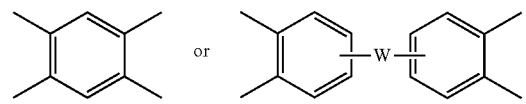

wherein W is a single bond, —S—, —C(O)—, —SO$_2$—, —SO—, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the polyetherimide.

In an embodiment in formula (11), R is m-phenylene or p-phenylene and Z is a divalent group of formula (3a). Alternatively, R is m-phenylene or p-phenylene and Z is a divalent group of formula (3a) and Q is 2,2-isopropylidene.

In another embodiment the poly(etherimide) can be a poly(etherimide-siloxane) block or graft copolymer. Block poly(etherimide-siloxane) copolymers comprise etherimide units and siloxane blocks in the polymer backbone. The imide or etherimide units and the siloxane blocks can be present in random order, as blocks (i.e., AABB), alternating (i.e., ABAB), or a combination thereof. Graft copolymers are non-linear copolymers comprising the siloxane blocks connected to a linear or branched polymer backbone comprising imide or etherimide blocks.

In an embodiment, a poly(etherimide-siloxane) has units of the formula

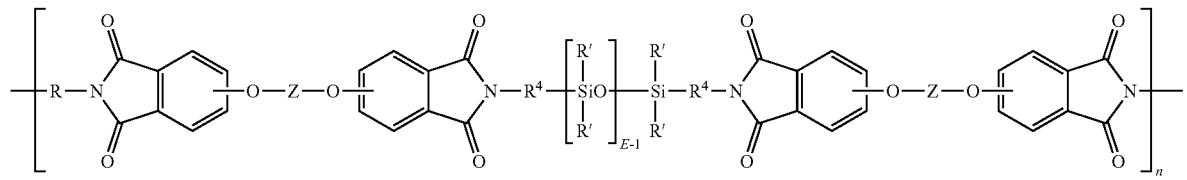

wherein R' and E of the siloxane are as in formula (6), the R and Z of the imide are as in formula (2), $R^4$ is the same as $R^4$ as in formula (6), and n is an integer from 5 to 100. In a specific embodiment, the R of the etherimide is a phenylene, Z is a residue of bisphenol A, $R^4$ is n-propylene, E is 2 to 50, 5, to 30, or 10 to 40, n is 5 to 100, and each R' of the siloxane is methyl. In an embodiment the poly(etherimide-siloxane) comprises 10 to 50 wt %, 10 to 40 wt %, or 20 to 35 wt % polysiloxane units, based on the total weight of the poly(etherimide-siloxane).

The poly(imide) can have a weight average molecular weight of 5,000 to 200,000 grams per mole. In some embodiments, the poly(imide) can have a weight average molecular weight of 5,000 to 50,000 grams per mole. In some embodiments, the poly(imide) can have a weight average molecular weight of greater than or equal to 50,000 grams per mole, preferably 50,000 to 100,000 grams per mole, and a polydispersity index of less than or equal to 3, preferably less than or equal to 2.5. Weight average molecular weight and polydispersity index can be determined, for example, using gel permeation chromatography (GPC) relative to polystyrene standards.

The poly(imide) prepolymer powders and varnishes described herein can be used in the manufacture of articles useful for a wide variety of applications. For example, an article can be manufactured from the poly(imide) prepolymer varnish by forming a preform comprising the article from the poly(imide) prepolymer varnish or powder, for example, by spinning, spraying, casting, coating a substrate, impregnating a porous substrate, coating a surface of a mold, or disposing the poly(imide) prepolymer varnish or powder in a mold. The preform can accordingly have the form of a fiber, a coating, or a layer. The coatings and layers can have a wide range of thicknesses, for example from 0.1 to 1500 micrometers, or from 1 to 250 micrometers. The thickness can be adjusted by adjusting the amount of solids in the compositions, or by using a doctor blade or similar device.

The preform can subsequently be heated at a temperature and for a period of time effective to imidize the poly(imide) prepolymer varnish or powder and form the corresponding poly(imide). Suitable temperatures are greater than or equal to 150° C., preferably 200 to 500° C., more preferably 300 to 450° C., even more preferably from 350 to 400° C. for a time from 30 seconds to 3 hours, preferably 15 minutes to 1 hour. The imidization can be conducted under an inert gas during the heating. Examples of such gases are dry nitrogen, helium, argon and the like. Dry nitrogen is generally preferred. In an advantageous feature, such blanketing is not required. The imidization is generally conducted at atmospheric pressure.

When present (e.g., when the poly(imide) prepolymer varnish is used), solvent can be removed from the preform during the imidization, or the solvent can be removed from the preform before the imidization, for example by heating to a temperature below the imidization temperature. The solvent can be partially removed, or can be fully removed.

If a crosslinker is present in the poly(imide) prepolymer powder or varnish, crosslinking can occur before the imidization, during the imidization, or after the imidization. For example, when the crosslinker comprises ethylenically unsaturated groups, the preform can be crosslinked by exposure to ultraviolet (UV) light, electron beam radiation or the like, to stabilize the preform. Alternatively, the poly(imide) can be post-crosslinked to provide additional strength or other properties to the poly(imide).

Articles comprising the poly(imide) formed from the poly(imide) prepolymer powder or varnish can include a fiber, a layer, a conformal coating, a molded article, a membrane, a prepreg, a composite article, or a composite molded article.

A method of manufacturing a composite article can comprise impregnating a porous base material with the poly(imide) prepolymer varnish or the poly(imide) prepolymer powder, and subsequently imidizing the varnish to form a poly(imide) coating or filling the porous base material. As used herein, a "porous base material" can be any base material having any size pores or openings that may or may not be interconnected. Thus, a porous base material can be a fibrous preform or substrate, a porous material comprising a ceramic, a polymer, a glass, carbon or a combination thereof. For example, the porous base material can be woven or non-woven glass fabric, a fiber glass fabric, or carbon fiber. Removing the solvent from the impregnated porous base material can be achieved by heating, compressing, or heating and compressing the material. The impregnated porous base material can optionally be shaped before or after the imidization, and before or after the solvent removal step. The impregnated porous base material can also be shaped after curing, by thermoforming, for example. The composite article prepared by the above-described method can be in the form of a fiber, a layer, a cast article, a prepreg, a laminate, a wire coating, a molded article, a compression article, or a reinforced composite article.

This disclosure is further illustrated by the following examples, which are non-limiting.

EXAMPLES

The materials shown in Table 1 were used in the following examples.

TABLE 1

| Component | Chemical Name | Molecular weight (g/mol) | Supplier |
|---|---|---|---|
| BPA-DA | Bisphenol A dianhydride | 520.5 | SABIC |
| PMDA | Pyromellitic dianhydride | 218.12 | Fisher Scientific |
| PPD | Para-phenylene Diamine | 108.14 | Dupont |
| MPD | Meta-phenylene Diamine | 108.14 | Dupont |
| DDS | Diaminodiphenyl Sulfone | 248.30 | Fisher Scientific |
| ODA | 4,4'-Oxydianiline | 200.24 | TCI America |
| MeOH | Methanol | 32.04 | Fisher Scientific |
| MEK | Methyl Ethyl Ketone | 72.11 | Fisher Scientific |
| TEA | Triethylamine | 101.19 | Fisher Scientific |
| DBA | Dibutylamine | 129.24 | Fisher Scientific |
| DMEA | Dimethylethanolamine | 89.14 | Fisher Scientific |

In the following Examples, weight average molecular weight (Mw) and number average molecular weight are given in grams/mole (g/mol).

Example 1: Poly(Imide) Prepolymer Powder Formation Using Methanol as Dispersion Medium Poly(imide) prepolymer powder was formed from the reaction of a dianhydride and a diamine as a slurry in an alcohol solvent. Bisphenol A Dianhydride (BPA-DA) was ground using a lab grinder to form particles having a maximum diameter of less than or equal to 300 micrometers. In a three neck glass reactor equipped with an agitator, a nitrogen inlet, and a cold water-circulating reflux condenser, the ground BPA-DA powder (800 grams, 1.537 moles) and methanol (1600 grams) were added to form a slurry. The slurry was stirred under nitrogen atmosphere at 23° C. for ten minutes. To the slurry, an equimolar amount of para-phenylene diamine (PPD) powder (166.2 grams, 1.537 moles) was added slowly to the BPA-DA slurry with continuous agitation under nitrogen. The slurry was further stirred under nitrogen atmosphere at 23° C. for 5 hours. During the course of the reaction, a small amount of the slurry (2 gram portions) was periodically removed from the reaction mixture and dried using vacuum oven at 65° C. to remove the solvent. The resulting dried prepolymer powder was evaluated for residual monomers using high performance liquid chromatography (HPLC).

HPLC was used to identify and quantify residual monomers using a UV/Vis detector. Pure PPD was used to construct a calibration curve by HPLC using standard solutions having concentrations in the range of 1 to 1000 ppm. The dried poly(imide) prepolymer sample (0.015 grams) was mixed with 10 milliliters of acetonitrile and sonicated for ten minutes. The resulting slurry was filtered using a 0.45 micrometer filter, and the filtrate was analyzed for diamine residual monomer (i.e., residual PPD).

The residual PPD amounts gradually decreased as the reaction time increased, as shown in Table 2. As shown in Table 2, after 5 hours, low levels of (e.g., less than 10 ppm) PPD residual monomer was observed, indicating completion of reaction.

TABLE 2

| Example | Description | Reaction time (hours) | Residual PPD (ppm) |
|---|---|---|---|
| 1A | Poly(imide) prepolymer from slurry | 1 | 3838 |
| 1B | Poly(imide) prepolymer from slurry | 2 | 3073 |
| 1C | Poly(imide) prepolymer from slurry | 3 | 1282 |
| 1D | Poly(imide) prepolymer from slurry | 4 | 131 |
| 1E | Poly(imide) prepolymer from slurry | 5 | <10 |

When the slurry was found to have low levels of PPD (e.g., less than 10 ppm), the slurry was transferred to an aluminum pan and placed in a vacuum oven at 65° C. for two days under a 2 inches of mercury (inHg) vacuum. The resulting pale yellow-colored poly(imide) prepolymer was ground using a blender to form a fine powder. The residual diamine content in the dry powder was evaluated via HPLC and confirmed to be less than 10 ppm.

Examples 2-6: Poly(imide) Formation From Prepolymer Powder

Example 1E poly(imide) prepolymer powder (2 grams) was transferred to a PTFE-coated aluminum tube. The contents were heated to 385° C. under constant purging with nitrogen for 15 minutes. The resulting poly(imide) polymer block was made into a thin film by heating at 380° C. under pressure (1400 psi, 9.65 MPa). The molecular weight of the resulting polymer film (shown as Example 1F in Table 3 below) was determined using gel permeation chromatography (GPC). For molecular weight analysis by GPC, the poly(imide) (0.015 grams) was dissolved in 10 milliliters of a solvent mixture of methylene chloride and hexafluoroisopropyl alcohol (70:30 v/v). A 10 microliter sample of the polymer solution was analyzed by GPC. The molecular weight of the poly(imide) was determined relative to polystyrene standards.

As shown in Table 3, high molecular weight poly(imide) (e.g., weight average molecular weight of greater than 55,000 grams per mole) can be formed with a polydispersity index (PDI) of less than 2.5.

TABLE 3

| Example | Description | Mw (g/mol) | Mn (g/mol) | PDI |
|---|---|---|---|---|
| 2 | Poly(imide) polymer formed from Example 1E | 57,450 | 25,500 | 2.25 |

The poly(imide) prepolymer powder (Example 1E) was found to be soluble in methanol when a secondary or a tertiary amine (e.g., dibutylamine or triethylamine, respectively) was added, as shown in Table 4. The minimum amount of secondary or tertiary amine required to produce a complete homogeneous solution was 0.2 to 0.25 grams per 1 gram of prepolymer powder. The resulting poly(imide) prepolymer solutions (Examples 3 and 4 in Table 4) were further converted to the corresponding poly(imide)s (Examples 5 and 6) upon heating at 385° C. under constant nitrogen purging. The molecular weights of the resulting poly(imide)s are also given in Table 4.

TABLE 4

| Ex. No. | Description | Example 1E (g) | Methanol (g) | Minimum TEA (g) | Minimum DBA (g) | Mw (g/mol) | Mn (g/mol) | PDI |
|---|---|---|---|---|---|---|---|---|
| 3 | Poly(imide) prepolymer homogeneous solution | 1 | 1 | 0.21 | — | — | — | — |
| 4 | Poly(imide) prepolymer homogeneous solution | 1 | 1 | — | 0.25 | — | — | — |
| 5 | Poly(imide) polymer formed from Example 3 | — | — | — | — | 66,500 | 33,800 | 1.97 |
| 6 | Poly(imide) polymer formed from Example 4 | — | — | — | — | 59,900 | 25,760 | 2.32 |

Comparative Examples 1-6: Poly(Imide) Prepolymer Formation Using Methanol as Reaction Medium in Solution Phase As a comparative example, a poly(imide) prepolymer solution was made under refluxing conditions by completely dissolving BPA-DA in methanol and reacting it with PPD monomer. BPA-DA was ground using a lab grinder to form particles having a maximum diameter of less than or equal to 300 micrometers. The ground BPA-DA (32 grams, 0.0615 moles) in 40 grams of methanol was taken in a three neck 250 milliliter glass round bottom flask equipped with a stirrer, nitrogen inlet, and a cold water circulating refluxing condenser. The contents were stirred under nitrogen atmosphere and refluxed using an oil bath maintained at 70° C. BPA-DA completely dissolved after three hours to form a homogeneous solution. To the homogeneous solution, PPD powder (6.65 grams, 0.0615 moles) was added slowly. PPD completely dissolved in the reaction medium and the contents were refluxed under nitrogen atmosphere for another twenty hours. During the course of reaction, two grams of the homogeneous solution was taken out periodically and dried in a vacuum oven at 65° C. to remove the solvent. The resulting prepolymer powder was evaluated for residual monomers by HPLC method, as described above. It can be seen from Table 5 that residual diamine levels were very high initially, and decrease as reaction time increases. However, even after twenty hours of refluxing conditions, high levels of residual diamine (e.g., greater than 2500 ppm) was observed in the samples obtained from the solution process.

TABLE 5

| Example | Description | Reaction time (hours) | Residual PPD (ppm) |
|---|---|---|---|
| CE1 | Poly(imide) prepolymer from homogeneous methanol solution | 1 | 70,398 |
| CE2 | Poly(imide) prepolymer from homogeneous methanol solution | 2 | 76,978 |
| CE3 | Poly(imide) prepolymer from homogeneous methanol solution | 3 | 23,302 |
| CE4 | Poly(imide) prepolymer from homogeneous methanol solution | 4 | 23,539 |
| CE5 | Poly(imide) prepolymer from homogeneous methanol solution | 5 | 31,253 |
| CE6 | Poly(imide) prepolymer from homogeneous methanol solution | 20.5 | 2627 |

Example 7: Preparation of Poly(Imide) Prepolymer Solution with Tertiary Amine from a Prepolymer Slurry BPA-DA powder (170 grams; 0.3266 moles) and methanol (250 grams) were taken in a three neck 2 liter glass reactor equipped with a stirrer, nitrogen inlet, and a cold water circulating refluxing condenser to form a slurry. The slurry was stirred under a nitrogen atmosphere at 23° C. To the slurry, PPD powder (35.3069 grams; 0.3265 moles) was added slowly. The mixture was stirred for 3 hours under nitrogen atmosphere at 50° C. During the course of the reaction, 0.3 grams of the slurry was removed periodically and dried in a vacuum oven at 80° C. to remove the solvent. The resulting dried prepolymer powder was evaluated for residual monomers using the HPLC method, as described above. After 3 hours of reaction, low levels of PPD residual monomer (<10 ppm) were noted, indicating completion of the reaction.

Triethylamine (47.5 grams, 0.4694 moles) was added to the reactor and continued agitation at 50° C. overnight, resulting in a homogenous solution. HPLC analysis confirmed that the final poly(imide) prepolymer in the homogeneous solution also contained <10 ppm residual diamine.

The final poly(imide) prepolymer solution had 41.5% solids content and exhibited a viscosity of 58.5 centipoise (cP) at 23° C. The final poly(imide) prepolymer solution was heated to 385° C. under nitrogen purging for 15 minutes to form the corresponding poly(imide). The molecular weight of the resulting dried poly(imide) polymer was measured using GPC and shown in Table 6 as Example 7. It can be seen that high molecular weight (>50,000 g/mole) poly(imide) polymer can be formed with a polydispersity index of <2.5. The poly(imide) polymer exhibited Tg of 231.2° C. and a TGA onset temperature of 546.8° C. in air and 550.2° C. in nitrogen.

TABLE 6

| Example | Mw (g/mol) | Mn (g/mol) | PDI |
|---|---|---|---|
| 7 | 89,700 | 50,900 | 1.76 |

Thermal Desorption Gas Chromatography-Mass Spectrometry (TD-GC-MS) was also used to analyze the low levels of residual monomers in the poly(imide) prepolymer solution. The above poly(imide) prepolymer solution (1 gram) was dried in a vacuum oven at 80° C. to substantially remove the solvent. The resulting solid was analyzed by TD-GC-MS. The sample was heated to 350° C. for 15 minutes, and desorbed compounds were cryogenically trapped (at a temperature of −120° C.). The trap was then rapidly heated to 350° C. and evolved compounds were analyzed by GC-MS.

GC-MS analysis was performed using an Agilent 5975 GC-MS instrument. A ZB-5MS column (30 meters×0.25 millimeters (inner diameter)×0.25 micrometers film thickness) was used to separate the analytes of interest. The oven was initially held at 60° C. for 5 minutes and then ramped at a rate of 10° C./min to a temperature of 250° C. and held for 6 minutes. A helium carrier gas was used at a constant flow rate of 1.0 millimeter per minute. The mass spectrometer was operated in scan mode (35-1000 amu). Residual diamine (e.g., PPD, having a molecular weight of 108.1 grams per mole) was not detected in the evolved compounds using this method. Thus, the TD-GC-MS method confirmed the low levels of residual diamine monomer present in the poly(imide) prepolymer solution.

Example 8: Preparation of Poly(Imide) Prepolymer Solution with Tertiary Amine from a Prepolymer Slurry Using Acetone as Dispersion Medium BPA-DA powder (170 grams; 0.3266 moles) and acetone (297 grams) were taken in a three neck 2 liter glass reactor equipped with a stirrer, nitrogen inlet, and a cold water-circulated refluxing condenser to form a slurry. The slurry was stirred under a nitrogen atmosphere at 23° C. To the slurry, PPD powder (35.3069 grams; 0.3265 moles) was added slowly. The contents were stirred for 25 minutes under nitrogen atmosphere at 23° C. During the course of the reaction, 0.3 grams of the slurry was periodically removed and dried in a vacuum oven at 80° C. to remove the solvent. The resulting prepolymer powder was evaluated for residual PPD monomer using the HPLC method, as described above. After 25 minutes of reaction, low levels of PPD residual monomer (<10 ppm) was noted, indicating completion of the reaction.

Upon completion of the reaction, methanol (176 grams) and triethylamine (71 grams, 0.70165 moles) were added to the reactor and agitation was continued at 60° C. overnight, resulting in a homogenous solution. HPLC analysis confirmed that the final homogeneous solution also contained <10 ppm residual diamine.

The final poly(imide) prepolymer solution had 53% solids content and exhibited a viscosity of 1420 cP at 23° C. The final poly(imide) prepolymer solution (1 gram) was heated to 385° C. under nitrogen purging for 15 minutes to form the corresponding poly(imide). The molecular weight of the resulting polymer was measured using GPC and is shown in Table 7 as Example 8. It can be seen that high molecular weight (>50,000) poly(imide) polymer can be formed with a polydispersity index of <2.5. The poly(imide) polymer exhibited a Tg of 230.6° C. and a TGA onset temperature of 547.9° C. in air and 551.2° C. in nitrogen.

TABLE 7

| Example | Mw (g/mol) | Mn (g/mol) | PDI |
| --- | --- | --- | --- |
| 8 | 90,000 | 51,500 | 1.84 |

Examples 9-10: Preparation of Poly(Imide) Prepolymer Solution with Tertiary Amine from a Prepolymer Slurry Using Acetone as Dispersion Medium BPA-DA powder (170 grams; 0.3266 moles) and acetone (297 grams) were taken in a three neck 2 liter glass reactor equipped with a stirrer, nitrogen inlet and a cold water-circulated refluxing condenser to form a slurry. The slurry was stirred under a nitrogen atmosphere at 23° C. To the slurry, PPD powder (35.3065 grams; 0.3265 moles) was added slowly. The contents were stirred for 25 minutes under nitrogen atmosphere at 23° C. During the course of the reaction, 0.3 grams of the slurry was removed periodically and dried in a vacuum oven at 80° C. to remove the solvent. The resulting prepolymer powder was evaluated for residual monomers using the HPLC method, described above. After 25 minutes of reaction, low levels of PPD residual monomer (<10 ppm) were noted, indicating completion of the reaction.

Upon completion of the reaction, water (176 grams) and triethylamine (71 grams, 0.70165 moles) were added to the reactor and agitation was continued at 60° C. overnight, resulting in a homogenous solution. It was confirmed that the final homogeneous solution contained <10 ppm residual diamine using HPLC analysis.

The final poly(imide) prepolymer solution had 34% solids content and exhibited a viscosity of 140 cP at 23° C. The final poly(imide) prepolymer solution (1 gram) was heated to 385° C. under nitrogen purging for 15 minutes to provide the corresponding poly(imide) polymer. The molecular weight of the resulting polymer was measured using GPC and shown in Table 8 as Example 9. Example 9 shows that high molecular weight (>50,000 g/mole) poly(imide) polymer can be formed with a polydispersity index of <2.5. The poly(imide) polymer exhibited a Tg of 230° C. and a TGA onset temperature of 548.8° C. in air and 547.5° C. in nitrogen.

TABLE 8

| Example | Mw (g/mol) | Mn (g/mol) | PDI |
| --- | --- | --- | --- |
| 9 | 87,900 | 51,200 | 1.91 |

Similarly, a homogenous poly(imide) prepolymer solution was prepared by converting the poly(imide) prepolymer powder slurry to a solution through addition of N,N-dimethylethanolamine (DMEA) and water. In this example, BPA-DA powder (120.0772 grams, 0.2307 moles) and acetone (341.4 grams) were taken in a three neck 2 liter glass reactor equipped with a stirrer, nitrogen inlet, and a cold water-circulated refluxing condenser to form a slurry. The contents were stirred under a nitrogen atmosphere at 23° C. Additionally, acetone (347.8 grams) and deionized water (235 grams) were then added. To the slurry, PPD powder (24.9222 grams, 0.2305 moles) was added slowly, followed by another addition of additional acetone (24.9222 grams). The contents were stirred for 20 minutes under nitrogen atmosphere at 30° C. After 20 minutes of reaction, DMEA (60.5 grams, 0.6787 moles) was added. The reactor contents were refluxed overnight, resulting in a homogeneous solution. Most of the acetone was removed by distillation and deionized water (160 grams) was added, resulting in a golden-colored homogeneous solution. A portion of the homogeneous solution (0.3 grams) was dried in a vacuum oven at 80° C. to remove the solvent.

The resulting prepolymer powder was evaluated for residual monomers using the HPLC method, as described above. Low levels of residual diamine (<10 ppm) were noted in the prepolymer powder.

The final poly(imide) prepolymer solution had 13% solids content. The final poly(imide) prepolymer solution (1 gram) was heated to 385° C. under nitrogen purging for 15 minutes to form the corresponding poly(imide) polymer. The molecular weight of the resulting polymer was measured using GPC and is shown in Table 9 as Example 10. As with example 9, high molecular weight (>50,000 g/mole) poly (imide) polymer can be formed with a polydispersity index of <3.0. Thus, various tertiary amines can be useful in forming the homogenous poly(imide) prepolymer solutions.

TABLE 9

| Example | Mw (g/mol) | Mn (g/mol) | PDI |
|---|---|---|---|
| 10 | 77,605 | 28,346 | 2.737 |

The poly(imide) prepolymer homogeneous solution was also coated onto a glass plate, and placed in an air-circulated oven at a temperature of 200° C. for 20 minutes. This resulted in a poly(imide) polymer film having a molecular weight of 26, 682 g/mol, as determined using GPC. This experiment indicates that high molecular weight poly(imide) polymers can also be made using lower temperatures, and at atmospheric conditions.

Example 11: Preparation of Poly(Imide) Prepolymer Solution from a Prepolymer Slurry Using Acetone/Water as Dispersion Medium Acetone (430 grams) was taken in a three neck 2 liter glass reactor equipped with a stirrer, nitrogen inlet and a cold water-circulated refluxing condenser. BPA-DA powder (256.4492 grams, 0.4927 moles) and deionized water (185.5 grams) was added to the reactor with stirring to form a slurry. To the slurry, MPD (53.1155 grams, 0.4912 moles) and acetone (315 grams) was added, while continuing stirring. The slurry was stirred under a nitrogen atmosphere at 23° C. for 15 minutes. The reactor was placed in an oil bath maintained at a temperature of 55° C. After 30 minutes of reaction, additional acetone (50 grams) was added and the reactor contents became completely homogeneous (even in the absence of any secondary or tertiary amine). A portion of the homogeneous solution (0.3 grams) was removed and dried in a vacuum oven at 80° C. to remove the solvent. The resulting prepolymer powder was evaluated for residual monomers using the HPLC method, described above. Low levels of MPD residual diamine monomer (<10 ppm) were noted, indicating completion of the reaction.

A portion of the final poly(imide) prepolymer solution (1 gram) was heated to 385° C. under nitrogen purging for 15 minutes to provide the corresponding poly(imide) polymer. The molecular weight of the resulting polymer was measured using GPC and is shown in Table 10 as Example 11. It can be seen high molecular weight (>50,000 g/mole) poly(imide) polymer can be formed with a polydispersity index of <2.5. The poly(imide) polymer further exhibited a Tg of 215.4° C. and a TGA onset temperature of 544° C. in air and 540.8° C. in nitrogen.

TABLE 10

| Example | Mw (g/mol) | Mn (g/mol) | PDI |
|---|---|---|---|
| 11 | 78,400 | 34,790 | 2.25 |

Example 12: Preparation of Poly(Imide) Prepolymer Solution from a Prepolymer Slurry Using Acetone/Water as Dispersion Medium BPA-DA (216 grams; 0.4149 moles) was taken in a three neck 2 liter glass reactor equipped with a stirrer, nitrogen inlet and a cold water-circulated refluxing condenser. Acetone (945 grams) and deionized water (54.20 grams) was added to the reactor contents with stirring to form a slurry. To the slurry, MPD (56.0745 grams; 0.5185 moles) was added, while stirring. The contents were stirred under a nitrogen atmosphere at 23° C. for 15 minutes. The reactor was placed in an oil bath maintained at a temperature of 55° C. After 30 minutes of reaction, PMDA (22.6298 grams; 0.1037 moles) was added to the slurry and the reactor contents were stirred for another 20 minutes until a completely homogeneous solution was formed. A portion of the homogeneous solution (0.3 grams) was taken out and dried in a vacuum oven at 80° C. to remove the solvent. The resulting prepolymer powder was evaluated for residual monomers using the HPLC method, as described above. Low levels of MPD residual monomer diamine (<10 ppm) was noted, indicating completion of the reaction.

A portion of the final poly(imide) prepolymer solution (1 gram) was heated to 385° C. under nitrogen purging for 15 minutes to provide the corresponding poly(imide) polymer. The molecular weight of the resulting polymer was measured using GPC and is shown in Table 11 as Example 12. It can be seen high molecular weight (>50,000 g/mole) poly(imide) polymer can be formed with a polydispersity index of <2.5. The poly(imide) polymer exhibited Tg of 232.4° C. and a TGA onset temperature of 538.7° C. in air and 538° C. in nitrogen.

TABLE 11

| Example | Mw (g/mol) | Mn (g/mol) | PDI |
|---|---|---|---|
| 15 | 62,560 | 32,340 | 1.93 |

Comparative Example 7: Preparation of Poly(Imide) Prepolymer Solution from a Prepolymer Slurry Using Acetone/Water as Dispersion Medium with PPD BPA-DA (216 grams; 0.4149 moles) was taken in a three neck 2 liter glass reactor equipped with a stirrer, nitrogen inlet and a cold water-circulated refluxing condenser. Acetone (945 grams) and deionized water (54.20 grams) was added to the reactor contents with stirring to form a slurry. To the slurry, PPD (44.9 grams; 0.4152 moles) was added, while stirring. The contents were stirred under a nitrogen atmosphere at 23° C. for 15 minutes. The reactor was placed in an oil bath maintained at a temperature of 55° C. Even after 5 hours of reaction time, the slurry did not convert to a homogeneous solution.

Examples 16-19 and Comparative Examples 8-13: Preparation of Poly(Imide) Prepolymer Solution from a Prepolymer Slurry Using Acetone/Water as Dispersion Medium BPA-DA (4 grams; 0.007685 moles) was taken in a scintillation vial along with varying amounts of acetone and deionized water, as shown in Table 12. The vial was capped and the mixture was shaken using a shaker table for one minute. MPD (0.832 grams; 0.007694 moles) was added to the mixture and the capped vial was sonicated for one minute. The vial was subsequently heated to 50° C. using an oil bath for 30 minutes. It was found that formulations containing greater than 4 wt % water and less than 25 wt % water resulted in homogeneous solutions, which is illustrated by samples 16 to 19. Samples containing less than or equal to 4 wt % water or greater than or equal to 25 wt % water resulted in non-homogeneous solution (noted "NHS" in Table 12), which is illustrated by comparative examples 8-13. It was also found that the viscosity of the homogenous solution can be modified by adjusting the water content.

Irrespective of water content, all homogenous solutions (i.e., examples 16-19) resulted in polyetherimides having a weight average molecular weight of greater than 50,000 grams per mole after heating at 385° C. under nitrogen purging for 15 minutes. It can further be noted from Table 12 that the resulting polyetherimides from all homogenous solutions have polydispersity index less than 3.0.

TABLE 12

| Ex. No. | H$_2$O (%)[1] | wt % solids | Acetone (g) | H$_2$O (g) | Viscosity (cP) | Heated at 385° C. for 15 minutes under nitrogen purging | | |
|---|---|---|---|---|---|---|---|---|
| | | | | | | Mw (g/mol) | Mn (g/mol) | PDI |
| CE8 | 0 | 25 | 14.49 | 0 | NHS | | | |
| CE9 | 1 | 25 | 14.3451 | 0.1449 | NHS | | | |
| CE10 | 2 | 25 | 14.2002 | 0.2898 | NHS | | | |
| CE11 | 3 | 25 | 14.0553 | 0.4347 | NHS | | | |
| CE12 | 4 | 25 | 13.9104 | 0.5796 | NHS | | | |
| 16 | 5 | 25 | 13.7655 | 0.7245 | 112.5 | 102,130 | 48,530 | 2.10 |
| 17 | 10 | 25 | 13.041 | 1.449 | 176.5 | 73,580 | 36,980 | 1.99 |
| 18 | 15 | 25 | 12.3165 | 2.1735 | 101.5 | 84,740 | 41,930 | 2.02 |
| 19 | 20 | 25 | 11.592 | 2.898 | 64.5 | 90,000 | 43,640 | 2.06 |
| CE13 | 25 | 25 | 10.8675 | 3.6225 | NHS | | | |

[1]Based on total weight of solvent

Examples 20 to 30 and Comparative Examples 14 to 17: Preparation of Poly(Imide) Prepolymer Solution Using Methyl Ethyl Ketone/Water The present inventors have discovered that dianhydride and diamine monomers can be reacted in methyl ethyl ketone (MEK), optionally in the presence of water, to provide homogenous prepolymer solutions. The prepolymer solution can be thermally converted to high molecular weight poly(imide) or poly(etherimide) having high molecular weight (e.g., greater than 55,000 grams per mole). Two processes were used to prepare the prepolymer solutions, described below as "Process A" and "Process B".

Process A: BPA-DA (2 grams; 0.00384 moles) powder was taken in a scintillation vial along with varying amounts of MEK and deionized water, as shown in Table 13. The vial was capped and the mixture was shaken using a shaker table for 3 minutes to form a slurry. Equimolar amount of diamine (MPD, DDS or ODA) was added to the slurried mixture and the capped vial was shaken using a shaker table for 5 minutes. Optionally, the vial was heated to 60° C. using an oil bath for up to 30 minutes. It was found that formulations containing MPD or ODA can form homogeneous solutions in the presence of deionized water, which is illustrated by samples 20 and 26. Surprisingly, formulations containing DDS can form homogeneous solutions in the presence or in absence of de-ionized water which is illustrated by example 22 and 24. Samples containing MPD or ODA in the absence of water resulted in non-homogenous solutions, indicated as "NHS" in Table 13 (examples CE14 and CE16).

All homogenous solutions resulted in polyetherimides having a weight average molecular weight of greater than 50,000 grams per mole after heating at 385° C. under nitrogen purging for 15 minutes. It can further be noted from Table 13 that the resulting polyetherimides from all homogenous solutions have polydispersity index less than 3.0.

Process B: Diamine (MPD, DDS or ODA; 0.00384 moles) was taken in a scintillation vial along with varying amounts of MEK and deionized water, as shown in Table 13. The vial was capped and the mixture was shaken using a shaker table or optionally heated to 60 deg C. till it formed a homogeneous solution. The equimolar amount of BPA-DA powder was added to the homogeneous solution and the capped vial was shaken using a shaker table for five minutes. Optionally, the vial was heated to 60° C. using an oil bath up to 30 minutes. It was found that formulations containing MPD or ODA can form homogeneous solutions in presence of deionized water, which is illustrated by examples 21 and 27. Surprisingly, formulations containing DDS can be made into homogeneous solutions in presence or in absence of de-ionized water which is illustrated by example 23 and 25. Samples containing MPD or ODA in absence of water resulted in non-homogenous solutions, indicated as "NHS" in Table 13 (examples CE15 and CE17). Example 27 (0.2 grams) was precipitated in acetonitrile and the contents were sonicated for 15 minutes in a sonicator containing deionized water at 60° C. Later the solution was filtered via 0.2 micrometer filter and evaluated for the residual ODA content in HPLC. Using a correlation curve based on ODA standards, example 27 contained 130 ppm of residual ODA, based on dry solid polymer content.

All homogenous solutions resulted in polyetherimides having a weight average molecular weight of greater than 50,000 grams per mole after heating at 385° C. under nitrogen purging for 15 minutes. It can further be noted from Table 13 that the resulting polyetherimides from all homogenous solutions have polydispersity index less than 3.0. Additionally, Example 27 represents a 10× scale up to generate varnish for viscosity measurements. The scaled up varnish exhibited an initial viscosity of 1045 centipoise (cP) (i.e., on the day it was prepared). After storing for 14 days at room temperature, the viscosity of the varnish increased only slightly to 1100 cP, indicating that the varnish is stable at room temperature without any degradation of molecular weight.

TABLE 13

| Ex. No. | Dianhydride | Diamine | Process | MEK (g) | Water (g) | Polyimide Polymer Properties[1] | | | |
|---|---|---|---|---|---|---|---|---|---|
| | | | | | | Mw (g/mol) | Mn (g/mol) | PDI | Tg, °C. |
| CE14 | BPA-DA | MPD | A | 7.3493 | 0.0 | NHS | NHS | NHS | |
| CE15 | BPA-DA | MPD | B | 7.3493 | 0.0 | NHS | NHS | NHS | |
| 20 | BPA-DA | MPD | A | 6.6119 | 0.7374 | 95,469 | 31,999 | 2.98 | 223.1 |
| 21 | BPA-DA | MPD | B | 6.6119 | 0.7374 | 96,756 | 33,746 | 2.87 | 221.8 |
| 22 | BPA-DA | DDS | A | 7.3493 | 0.0 | 90,552 | 34,440 | 2.63 | |
| 23 | BPA-DA | DDS | B | 7.3493 | 0.0 | 51,267 | 23,376 | 2.19 | |
| 24 | BPA-DA | DDS | A | 6.6119 | 0.7374 | 79,283 | 31413 | 2.52 | 248.7 |
| 25 | BPA-DA | DDS | B | 6.6119 | 0.7374 | 97,380 | 36,883 | 2.64 | 254.6 |
| CE16 | BPA-DA | ODA | A | 7.3493 | 0.0 | NHS | NHS | NHS | |
| CE17 | BPA-DA | ODA | B | 7.3493 | 0.0 | NHS | NHS | NHS | |
| 26 | BPA-DA | ODA | A | 6.6119 | 0.7374 | 108581 | 37236 | 2.916 | |
| 27 | BPA-DA | ODA | B | 6.6119 | 0.7374 | 128,404 | 52,973 | 2.42 | 222.6 |

[1]Determined after heating at 385° C. for 15 minutes under nitrogen purging

Examples 28 to 30: Preparation of High Molecular Weight Polyimides in Constant Thickness Film Maker A poly(imide) prepolymer varnish prepared from ODA and BPA-DA (shown as example 27 in Table 13) was made into a thin coating in a glass plate. The Example 27 varnish was diluted with 10% or 20% anisole. The glass plates containing the thin coating were placed on a metal plate housing which was purged with nitrogen constantly. The metal plate housing was kept on a hot plate which was programmed to ramp up according to the following:

| Step | Starting Temp. (° C.) | Ending Temp. (° C.) | Ramp Time (mins) |
|---|---|---|---|
| 1 | 22 | 24 | 15 |
| 2 | 24 | 40 | 15 |
| 3 | 40 | 120 | 30 |
| 4 | 120 | 120 | 30 |
| 5 | 120 | 160 | 30 |
| 6 | 160 | 160 | 15 |
| 78 | 160 | 200 | 15 |
| 9 | 200 | 200 | 15 |
| 10 | 200 | 375 | 30 |
| 11 | 375 | 22 | |

After cooling the metal plate housing to 22° C., the glass plates were removed and soaked in deionized water for 24 hours. The remaining films were then peeled off the glass plates. The films were dried, then the molecular weight of the polymer was evaluated using gel permeation chromatography using polystyrene standards. As shown in Table 14, films prepared in the absence of anisole appeared foamy with molecular weights of greater than 75,000 grams per mole. Addition of 10 or 20% anisole reduced the foam, and yielded transparent films with polymer molecular weights of greater than 85,000 grams per mole. Thus, the addition of organic solvents that are good solvents for poly(imide)s (e.g., anisole) can decrease the foam and improve film transparency, and provide high molecular weight poly(imide).

TABLE 14

| Example | Wt % Anisole | Film Quality | Mw (g/mol) | Mn (g/mol) | PDI |
|---|---|---|---|---|---|
| 28 | 0 | Foamy Surface | 75,000 | 26,800 | 2.80 |
| 29 | 10 | Reduced foam in surface | 89,000 | 30,200 | 2.95 |
| 30 | 20 | Reduced foam in surface | 110,200 | 40,000 | 2.75 |

Example 31: Preparation of Poly(Imide) Prepolymer Powder Using Methyl Ethyl Ketone/Water In a three neck glass reactor equipped with an agitator, a nitrogen inlet, and a cold water-circulating reflux condenser, the MPD powder (0.03796 moles), deionized water (7.374 grams) and methyl ethyl ketone (66.119 grams) were added and stirred until the solution became clear and homogeneous. To the solution, an equimolar amount of BPA-DA powder was added slowly. The slurry was further stirred under nitrogen atmosphere at 23° C. for 3 hours. This results in a light yellow colored polyimide prepolymer varnish. Once the solution was homogeneous, the solvent was removed by nitrogen purging for 48 hours, resulting in a poly(imide) prepolymer powder. It was found that the prepolymer powder was not soluble in acetone or MEK. However, when the acetone or MEK contained 10 wt % deionized water, the prepolymer powder was readily soluble to form a polyimide varnish.

Examples 32 to 35: Preparation of Poly(Imide) Polymer Films from MEK/Water with 2-Ethoxyethyl Acetate Diamine (MPD or ODA; 0.00384 moles) was taken in a scintillation vial along with 6.6119 grams of MEK and 0.7374 grams of deionized water. The vial was capped and the mixture was shaken using a shaker table or heated to 60° C. until a homogeneous solution was formed. An equimolar amount of BPA-DA powder was added to the homogeneous solution and the capped vial was shaken using a shaker table for five minutes. Optionally, the vial could be heated to 60° C. using an oil bath for up to 30 minutes to form a homogeneous solution. To part of the solution, 20 wt % of 2-ethoxyethyl acetate (based on the total solvent weight) was added and mixed thoroughly to form homogeneous solution. In a clean glass plate, uniform coatings of varnishes with and without 20 wt % 2-ethoxyethyl acetate were made and allowed to dry in air for 5 minutes. The glass plate was then heated at 80° C. for 5 minutes in a pre-heated air circulated oven followed by heating at 220° C. for 5 minutes in another pre-heated air circulated oven. The glass plate was allowed to cool to room temperature. The varnishes which did not contain 2-ethoxyethyl acetate solvent showed films with increased amounts of foam and were not transparent compared to the varnished including 2-ethoxyethyl acetate. The varnish samples that contained 20 wt % of 2-ethoxyethyl acetate formed transparent films with minimal foaming. The GPC results of samples containing 20 wt % 2-ethoxyethyl acetate indicate moderate molecular weight polymer films with PDI<3.0, as shown in samples 32 and 34 in Table 15, below. A portion of varnish samples containing 20 wt % 2-ethoxyethyl acetate were also heated to 385° C. for 15 minutes under nitrogen to form the corresponding polyetherimide. The resulting polymers exhibited molecular weight of >90,000 grams per mole, as shown in examples 33 and 35 in Table 15.

TABLE 15

| Ex. No. | Diamine | Wt % 2-ethoxyethyl acetate | Heating Profile | Film Quality | Mw (g/mol) | Mn (g/mol) | PDI |
| --- | --- | --- | --- | --- | --- | --- | --- |
| 32 | MPD | 20 | 80° C. for 5 min; 220° C. for 5 min; in air | Transparent film with occasional foam | 30,640 | 12,970 | 2.36 |
| 33 | MPD | 20 | 385° C. for 15 min; in nitrogen | | 93,720 | 30,850 | 3.00 |
| 34 | ODA | 20 | 80° C. for 5 min; 220° C. for 5 min; in air | Transparent film with occasional foam | 48,030 | 23,030 | 2.08 |
| 35 | ODA | 20 | 385° C. for 15 min; in nitrogen | | 93,360 | 35,660 | 2.61 |

This disclosure further encompasses the following embodiments, which are non-limiting.

Embodiment 1

A method for the manufacture of a poly(imide) prepolymer powder, the method comprising, combining a bisanhydride powder or an organic diamine and a solvent comprising a $C_{1-6}$ alcohol, acetone water soluble ketone, water, or a combination comprising at least one of the foregoing to form a mixture; adding an organic diamine or a bisanhydride powder to the mixture under conditions effective to form a poly(imide) prepolymer, provided that when the bisanhydride powder is combined with the solvent, the organic diamine is added to the mixture to form the poly(imide) prepolymer, and when the organic diamine is combined with the solvent, the bisanhydride powder is added to the mixture to form the poly(imide) prepolymer; and removing the solvent to provide the poly(imide) prepolymer powder; wherein the poly(imide) prepolymer powder has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

Embodiment 2

The method of embodiment 1, further comprising heating the mixture comprising the poly(imide) prepolymer to a temperature effective to provide a homogenous solution comprising dissolved poly(imide) prepolymer; and subsequently removing the solvent to provide the poly(imide) prepolymer powder.

Embodiment 3

A method for the manufacture of a poly(imide) prepolymer varnish, the method comprising, combining a bisanhydride powder or an organic diamine and a solvent comprising a $C_{1-6}$ alcohol, water soluble ketone, water, or a combination comprising at least one of the foregoing to form a mixture; and adding an organic diamine or a bisanhydride powder to the mixture under conditions effective to form a poly(imide) prepolymer, provided that when the bisanhydride powder is combined with the solvent, the organic diamine is added to the mixture to form the poly(imide) prepolymer, and when the organic diamine is combined with the solvent, the bisanhydride powder is added to the mixture to form the poly(imide) prepolymer; wherein the method further comprises at least one of the following process steps: adding an effective amount of a secondary or tertiary amine to solubilize the poly(imide) prepolymer in the solvent; heating the mixture comprising the poly(imide) prepolymer to a temperature effective to provide a varnish; and agitating the mixture under conditions effective to provide a varnish; and wherein the poly(imide) prepolymer varnish has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

Embodiment 4

The method of embodiment 3, wherein the method further comprises adding a secondary or tertiary amine to provide the homogeneous solution.

Embodiment 5

The method of embodiment 3, wherein the method further comprises heating the mixture comprising the poly(imide) prepolymer powder to a temperature effective to provide a homogeneous solution, preferably to a temperature of greater than or equal to 25° C., preferably greater than or equal to 40° C., more preferably 50 to 80° C. to provide the varnish.

Embodiment 6

The method of embodiment 3, wherein the method further comprises adding a secondary or tertiary amine to the slurry, and heating the mixture to a temperature of greater than or equal to 25° C., preferably greater than or equal to 40° C., more preferably 50 to 80° C. to provide the varnish.

Embodiment 7

The method of embodiment 3, wherein the method further comprises agitating the mixture under conditions effective to provide a varnish.

Embodiment 8

The method of embodiment 3, wherein the method further comprises agitating the mixture under conditions effective to provide a varnish, and heating the mixture to a temperature of greater than or equal to 25° C., preferably greater than or equal to 40° C., more preferably 50 to 80° C.

Embodiment 9

The method of embodiment 3, wherein a secondary or tertiary amine is excluded from the varnish.

Embodiment 10

The method of any one or more of embodiments 1 to 9, wherein the solvent acetone, methyl ethyl ketone, or a combination comprising at least one of the foregoing and water, preferably wherein the water is present in an amount of at least 0.01 wt % based on the total weight of the solvent.

Embodiment 11

The method of embodiment 10, wherein no secondary or tertiary amine is added to the slurry.

Embodiment 12

The method of any one or more of embodiments 1 to 11, wherein the $C_{1-6}$ alcohol comprises methanol, ethanol, n-propanol, isopropanol, or a combination comprising at least one of the foregoing, preferably methanol.

Embodiment 13

The method of any one or more of embodiments 1 to 12, wherein the bisanhydride is of formula (1); and the diamine is of formula (4).

Embodiment 14

The method of any one or more of embodiments 1 to 12, wherein the bisanhydride is an aromatic dianhydride is of formula (2) and the organic diamine is of formula (4).

Embodiment 15

The method of any one or more of embodiments 1 to 14, wherein combining the bisanhydride powder or the organic diamine and the solvent is at a temperature of 5 to 30° C., preferably 20 to 25° C.

Embodiment 16

The method of any one or more of embodiments 1 to 15, wherein adding the organic diamine or the bisanhydride powder is at a temperature of 5 to 30° C., preferably 20 to 25° C.

Embodiment 17

The method of any one or more of embodiments 1 to 16, wherein a reaction time sufficient to provide the poly(imide) prepolymer powder is greater than 15 minutes, preferably greater than 30 minutes, more preferably greater than 1 hour, even more preferably 4 to 8 hours.

Embodiment 18

The method of any one or more of embodiments 1 to 17, further comprising adding an end-capping agent to the slurry, preferably wherein the end-capping agent comprises phthalic anhydride, maleic anhydride, nadic anhydride, aniline, or a combination comprising at least one of the foregoing.

Embodiment 19

The method of any one or more of embodiments 1 to 18, further comprising adding a branching or crosslinking agent, preferably wherein the branching or crosslinking agent comprises a multifunctional anhydride or a multifunctional amine.

Embodiment 20

A poly(imide) prepolymer powder prepared by the method of any one or more of embodiments 1 to 2 and 10 to 19.

Embodiment 21

A poly(imide) prepolymer powder having a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

Embodiment 22

The poly(imide) prepolymer powder of embodiment 20 or 21, wherein the poly(imide) prepolymer powder comprises less than 1 wt % of a halogenated solvent, N-methyl pyrrolidone, dimethylacetamide, N,N-dimethyl formamide, tetrahydrofuran, sulfolane, anisole, cyclohexanone, cyclopentanone, dimethylsulfoxide, or a combination comprising at least one of the foregoing, preferably wherein the poly (imide) prepolymer is devoid of a halogenated solvent, N-methyl pyrrolidone, dimethylacetamide, N,N-dimethyl formamide, tetrahydrofuran, sulfolane, or a combination comprising at least one of the foregoing.

Embodiment 23

A poly(imide) prepolymer varnish prepared according to the method of any one or more of embodiments 3 to 19.

Embodiment 24

A poly(imide) prepolymer varnish, comprising the poly (imide) prepolymer powder of any one or more of embodiments 20 to 22; a secondary or tertiary amine; and a solvent comprising water, a $C_{1-6}$ alcohol, a water soluble ketone, or a combination comprising at least one of the foregoing, wherein the poly(imide) prepolymer varnish has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm.

Embodiment 25

A poly(imide) prepolymer varnish, comprising the poly (imide) prepolymer powder of any one or more of embodiments 20 to 22; and a solvent comprising acetone and water, preferably wherein the water is present in an amount of at least 4 wt % based on the total weight of the solvent; wherein the poly(imide) prepolymer varnish has a residual organic diamine content of less than or equal to 1000 ppm, or less than or equal to 100 ppm, or less than or equal to 75 ppm, or less than or equal to 50 ppm, or less than or equal to 25 ppm, or less than or equal to 10 ppm; and the prepolymer varnish excludes a secondary or tertiary amine.

Embodiment 26

The poly(imide) prepolymer varnish of embodiment 4 wherein the secondary amine comprises dibutylamine, and the tertiary amine comprises triethylamine, dimethylethanolamine, or a combination comprising at least one of the foregoing.

Embodiment 27

The poly(imide) prepolymer varnish of embodiments 24 or 26, wherein the solvent comprises methanol, acetone, methyl ethyl ketone, water, or a combination comprising at least one of the foregoing.

Embodiment 28

The poly(imide) prepolymer varnish of embodiment 25, wherein the solvent consists of acetone and water, preferably wherein the water is present in an amount of at least 4 wt % based on the total weight of the solvent.

Embodiment 29: poly(imide) prepolymer varnish of embodiment 25, wherein the solvent consists of methyl ethyl ketone and water, preferably wherein the water is present in an amount of at least 0.01 wt % based on the total weight of the solvent.

Embodiment 30

The poly(imide) prepolymer varnish of any one or more of embodiments 20 to 24, wherein the poly(imide) prepolymer varnish comprises less than 1 wt % of a halogenated solvent; less than or equal to 25 wt %, preferably less than or equal to 20 wt %, more preferably less than or equal to 10 wt % of N-methyl pyrrolidone, dimethylacetamide, N,N-dimethyl formamide, tetrahydrofuran, sulfolane, anisole, cyclohexanone, cyclopentanone, dimethylsulfoxide, 2-methoxyethyl acetate, 2-ethoxyethyl acetate, 2-butoxyethyl acetate, 1-methoxy 2-propanol acetate, Glycol ethers, Glycol esters, or a combination comprising at least one of the foregoing, preferably wherein the poly(imide) prepolymer varnish is devoid of N-methyl pyrrolidone, dimethylacetamide, N,N-dimethyl formamide, tetrahydrofuran, sulfolane, anisole, cyclohexanone, cyclopentanone, dimethylsulfoxide, or a combination comprising at least one of the foregoing; or both.

Embodiment 31

The poly(imide) prepolymer varnish of any one or more of embodiments 23 to 30, wherein the poly(imide) prepolymer varnish is devoid of a halogenated solvent, a N-methyl pyrrolidone, dimethylacetamide, N,N-dimethyl formamide, tetrahydrofuran, sulfolane, or a combination comprising at least one of the foregoing.

Embodiment 32

A method of preparing the poly(imide) prepolymer varnish of any one or more of embodiments 24, 26 to 27, or 30 to 31, the method comprising, dissolving the poly(imide) prepolymer powder in the solvent in the presence of the secondary or tertiary amine in an amount effective to solubilize the poly(imide) prepolymer powder in the solvent.

Embodiment 33

A method of preparing the poly(imide) prepolymer varnish of embodiment 25 or 28 to 31, the method comprising adding the poly(imide) prepolymer powder to the solvent to form a slurry and heating the slurry to a temperature effective to provide a homogeneous solution, preferably to a temperature of greater than or equal to 25° C.

Embodiment 34

A method of making a poly(imide), the method comprising heating the poly(imide) prepolymer powder of any one or more of embodiments 20 to 22 or the poly(imide) prepolymer varnish of any one or more of embodiments 23 to 31 to a temperature of greater than 150° C., preferably 200 to 500° C., more preferably 300 to 450° C., even more preferably 350 to 400° C. to provide the poly(imide).

Embodiment 35

A poly(imide) prepared by the method of embodiment 34, wherein the poly(imide) has a weight average molecular weight of 5,000 to 200,000 grams per mole, preferably 50,000 to 200,000 grams per mole, more preferably 50,000 to 100,000 grams per mole, and a polydispersity index of less than or equal to 3, preferably less than or equal to 2.5.

Embodiment 36

The poly(imide) of embodiment 35, wherein the poly (imide) comprises less than 1 wt % of a halogenated solvent, N-methyl pyrrolidone, dimethylacetamide, N,N-dimethyl formamide, tetrahydrofuran, sulfolane, or a combination comprising at least one of the foregoing, preferably wherein the poly(imide) is devoid of a halogenated solvent, N-methyl pyrrolidone, dimethylacetamide, N,N-dimethyl formamide, tetrahydrofuran, sulfolane, or a combination comprising at least one of the foregoing.

Embodiment 37

The poly(imide) of embodiment 35 or 36, wherein the polyimide is in the form of a film.

Embodiment 38

A method of making a prepreg, laminate or composite, the method comprising contacting the poly(imide) prepolymer varnish of any one or more of embodiments 23 to 31 with a fiber, fabric, veil, or mat and optionally removing at least a portion of the solvent by heating to a temperature of 22 to 150° C.; and further heating to a temperature of greater than 150° C., preferably 200 to 500° C., more preferably 300 to 450° C., even more preferably 350 to 400° C. to provide the prepreg, laminate or composite comprising the poly(imide); wherein the poly(imide) has a weight average molecular weight of 5,000 to 200,000 grams per mole, preferably 50,000 to 200,000 grams per mole, more preferably 50,000 to 100,000 grams per mole, and a polydispersity index of less than or equal to 3, preferably less than or equal to 2.5.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and include both the singular and the plural, unless otherwise indicated herein or clearly contradicted by context. "Or" means "and/or" unless clearly stated otherwise. Reference throughout the specification to "an embodiment" means that a particular element described in connection with the embodiment is included in at least one embodiment described herein, and may or may not be present in other embodiments. The described elements can be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(=O)$_2$-alkyl), a C$_{6-12}$ aryl sulfonyl (—S(=O)$_2$-aryl)a thiol (—SH), a thiocyano (—SCN), a tosyl (CH$_3$C$_6$H$_4$SO$_2$—), a C$_{3-12}$ cycloalkyl, a C$_{2-12}$ alkenyl, a C$_{5-12}$ cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A method for the manufacture of a poly(imide) prepolymer powder, the method comprising,
   combining a bisanhydride powder or an organic diamine and a solvent comprising a C$_{1-6}$ alcohol, water soluble ketone, water, or a combination comprising at least one of the foregoing to form a mixture;
   adding an organic diamine or a bisanhydride powder to the mixture under conditions effective to form a poly (imide) prepolymer, provided that when the bisanhydride powder is combined with the solvent, the organic diamine is added to the mixture to form the poly(imide) prepolymer, and when the organic diamine is combined with the solvent, the bisanhydride powder is added to the mixture to form the poly(imide) prepolymer; and
   removing the solvent to provide the poly(imide) prepolymer powder;
   wherein the poly(imide) prepolymer powder has a residual organic diamine content of less than or equal to 1000 ppm.

2. The method of claim 1, further comprising
   heating the mixture comprising the poly(imide) prepolymer to a temperature effective to provide a homogenous solution comprising dissolved poly(imide) prepolymer; and
   subsequently removing the solvent to provide the poly (imide) prepolymer powder.

3. The method of claim 1, wherein the solvent comprises acetone, methyl ethyl ketone, or a combination comprising at least one of the foregoing and water.

4. The method of claim 1, wherein the C$_{1-6}$ alcohol comprises methanol, ethanol, n-propanol, isopropanol, or a combination comprising at least one of the foregoing.

5. The method of claim 1, wherein
   combining the bisanhydride powder or the organic diamine and the solvent is at a temperature of 5 to 30° C.;
   adding the organic diamine or the bisanhydride powder is at a temperature of 5 to 30° C.; and
   wherein a reaction time sufficient to provide the poly (imide) prepolymer is greater than 5 minutes.

6. The method of claim 1, further comprising adding
   an end-capping agent to the slurry;
   a branching or crosslinking agent;
   or both.

7. A poly(imide) prepolymer powder prepared by the method of claim 1.

8. A poly(imide) prepolymer powder having a residual organic diamine content of less than or equal to 1000 ppm.

9. The poly(imide) prepolymer powder of claim 7, wherein the poly(imide) prepolymer powder comprises less than 1 wt % of a halogenated solvent, N-methyl pyrrolidone, dimethylacetamide, N,N-dimethyl formamide, tetrahydrofuran, sulfolane, anisole, cyclohexanone, cyclopentanone, dimethylsulfoxide, or a combination comprising at least one of the foregoing.

10. A method of making a poly(imide), the method comprising heating the poly(imide) prepolymer powder of claim 7 to a temperature of greater than 150° C. to provide the poly(imide).

* * * * *